(12) United States Patent
Harale et al.

(10) Patent No.: US 11,583,824 B2
(45) Date of Patent: Feb. 21, 2023

(54) HYDROGEN PRODUCTION WITH MEMBRANE REFORMER

(71) Applicant: Saudi Arabian Oil Company, Dhahran (SA)

(72) Inventors: Aadesh Harale, Dhahran (SA); Aqil Jamal, Dhahran (SA); Stephen N. Paglieri, Dhahran (SA); Henk van Veen, Bergen (NL); Francesco Sebastiani, Haarlem (NL); Gerard de Jong, Schagen (NL); Jaap Vente, Alkmaar (NL)

(73) Assignee: Saudi Arabian Oil Company, Dhahran (SA)

( * ) Notice: Subject to any disclaimer, the term of this patent is extended or adjusted under 35 U.S.C. 154(b) by 186 days.

(21) Appl. No.: 16/905,798

(22) Filed: Jun. 18, 2020

(65) Prior Publication Data

US 2021/0394152 A1 Dec. 23, 2021

(51) Int. Cl.
*B01J 19/24* (2006.01)
*B01J 19/00* (2006.01)
(Continued)

(52) U.S. Cl.
CPC ....... *B01J 19/2475* (2013.01); *B01J 19/0013* (2013.01); *B01J 19/242* (2013.01);
(Continued)

(58) Field of Classification Search
CPC . C01B 3/382; C01B 32/50; C01B 2203/0233; C01B 2203/041;
(Continued)

(56) References Cited

U.S. PATENT DOCUMENTS 978,576 A 12/1910 Goodell
2,614,066 A 10/1952 Cornell
(Continued)

FOREIGN PATENT DOCUMENTS

AU 2003286894 6/2004
AU 2005286952 3/2006
(Continued)

OTHER PUBLICATIONS

Abbassi et al., "Efficiency improvements in production profiling using ultracompact flow array sensing technology," Petrophysics, Aug. 2018, 59(4): 457-488.
(Continued)

*Primary Examiner* — Steven J Bos
*Assistant Examiner* — Syed T Iqbal
(74) *Attorney, Agent, or Firm* — Fish & Richardson P.C.

(57) ABSTRACT

A system and method for producing hydrogen from hydrocarbon and steam, including a membrane reformer with multiple membrane reactors each having a tubular membrane. The bore of the tubular membrane is the permeate side for the hydrogen. The region external to the tubular membrane is the retentate side for carbon dioxide. A sweep gas flows through the bore to displace hydrogen in a direction countercurrent to flow of hydrocarbon and steam in the region external to the tubular membrane. The method includes discharging hydrogen as permeate with the sweep gas from the bore, and discharging carbon dioxide in the region external to the tubular membrane as retentate from the membrane reactor.

39 Claims, 16 Drawing Sheets

(51) Int. Cl.
*C01B 3/38* (2006.01)
*C01B 3/48* (2006.01)
*C01B 3/50* (2006.01)

(52) U.S. Cl.
CPC ............ *C01B 3/382* (2013.01); *C01B 3/48* (2013.01); *C01B 3/503* (2013.01); *B01J 2219/0004* (2013.01); *B01J 2219/00085* (2013.01); *B01J 2219/00132* (2013.01); *C01B 2203/0233* (2013.01); *C01B 2203/0283* (2013.01); *C01B 2203/041* (2013.01); *C01B 2203/0475* (2013.01); *C01B 2203/085* (2013.01); *C01B 2203/1241* (2013.01); *C01B 2203/1264* (2013.01); *C01B 2203/142* (2013.01); *C01B 2203/146* (2013.01)

(58) Field of Classification Search
CPC ........ C01B 2203/042; C01B 2203/046; C01B 2203/1235
See application file for complete search history.

(56) References Cited

U.S. PATENT DOCUMENTS

| | | | |
|---|---|---|---|
| 2,910,426 A | 10/1959 | Gluesenkamp | |
| 3,278,268 A | 10/1966 | Pfefferle, Jr. | |
| 3,409,540 A | 11/1968 | Gould et al. | |
| 3,533,938 A | 10/1970 | Leas | |
| 3,702,292 A | 11/1972 | Burich | |
| 3,726,789 A | 4/1973 | Kovach | |
| 3,755,143 A | 8/1973 | Hosoi et al. | |
| 3,856,659 A | 12/1974 | Owen | |
| 3,979,757 A | 9/1976 | Kilby et al. | |
| 4,090,949 A | 5/1978 | Owen et al. | |
| 4,134,824 A | 1/1979 | Kamm et al. | |
| 4,264,435 A | 4/1981 | Read, Jr. et al. | |
| 4,297,203 A | 10/1981 | Ford et al. | |
| 4,426,276 A | 1/1984 | Dean et al. | |
| 4,466,946 A | 8/1984 | Goddin, Jr. et al. | |
| 4,527,003 A | 7/1985 | Okamoto et al. | |
| 4,587,011 A | 5/1986 | Okamoto et al. | |
| 4,589,896 A | 5/1986 | Chen et al. | |
| 4,655,904 A | 4/1987 | Okamoto et al. | |
| 4,717,407 A | 1/1988 | Choe et al. | |
| 4,725,349 A | 2/1988 | Okamoto et al. | |
| 4,786,400 A | 11/1988 | Farnsworth | |
| 4,830,728 A | 5/1989 | Herbst et al. | |
| 4,981,676 A | 1/1991 | Minet et al. | |
| 4,992,160 A | 2/1991 | Long et al. | |
| 5,091,351 A | 2/1992 | Murakawa et al. | |
| 5,108,581 A | 4/1992 | Aldridge | |
| 5,229,102 A | 7/1993 | Minet et al. | |
| 5,366,712 A | 11/1994 | Violante | |
| 5,401,300 A | 3/1995 | Lokhandwala et al. | |
| 5,407,466 A | 4/1995 | Lokhandwala et al. | |
| 5,407,467 A | 4/1995 | Lokhandwala et al. | |
| 5,746,985 A | 5/1998 | Takahashi | |
| 5,837,032 A | 11/1998 | Moll et al. | |
| 5,904,837 A | 5/1999 | Fujiyama | |
| 5,906,728 A | 5/1999 | Iaccino et al. | |
| 5,951,850 A | 9/1999 | Ino et al. | |
| 5,997,594 A | 12/1999 | Edlund et al. | |
| 6,033,555 A | 3/2000 | Chen et al. | |
| 6,119,606 A | 9/2000 | Clark | |
| 6,153,163 A | 11/2000 | Prasad | |
| 6,179,900 B1 | 1/2001 | Behling et al. | |
| 6,180,081 B1 | 1/2001 | Poschmann et al. | |
| 6,190,533 B1 | 2/2001 | Bradow et al. | |
| 6,210,562 B1 | 3/2001 | Xie et al. | |
| 6,274,032 B2 | 8/2001 | Hood et al. | |
| 6,293,979 B1 | 9/2001 | Choudhary et al. | |
| 6,296,686 B1 | 10/2001 | Prasad et al. | |
| 6,338,833 B1 | 1/2002 | Aasberg-Petersen | |
| 6,361,582 B1 | 3/2002 | Pinnau et al. | |
| 6,531,515 B2 | 3/2003 | Moore, Jr. et al. | |
| 6,656,346 B2 | 12/2003 | Ino et al. | |
| 6,743,961 B2 | 6/2004 | Powers | |
| 6,830,596 B1 | 12/2004 | Deckman et al. | |
| 6,896,717 B2 | 5/2005 | Pinnau et al. | |
| 6,960,235 B2 | 11/2005 | Morse et al. | |
| 6,979,757 B2 | 12/2005 | Powers | |
| 7,019,187 B2 | 3/2006 | Powers | |
| 7,022,165 B2 | 4/2006 | Paglieri et al. | |
| 7,025,941 B1 | 4/2006 | Autenrieth et al. | |
| 7,045,554 B2 | 5/2006 | Raje | |
| 7,132,042 B2 | 11/2006 | Genetti et al. | |
| 7,182,917 B2 | 2/2007 | Krueger | |
| 7,217,304 B2 | 5/2007 | Deckman et al. | |
| 7,323,148 B2 | 1/2008 | Shah et al. | |
| 7,353,982 B2 | 4/2008 | Li | |
| 7,374,664 B2 | 5/2008 | Powers | |
| 7,396,449 B2 | 7/2008 | Powers | |
| 7,404,889 B1 | 7/2008 | Powers | |
| 7,419,584 B2 | 9/2008 | Stell et al. | |
| 7,527,661 B2 | 5/2009 | Chellappa et al. | |
| 7,550,642 B2 | 6/2009 | Powers | |
| 7,642,292 B2 | 1/2010 | Severinsky | |
| 7,744,747 B2 | 6/2010 | Halsey | |
| 7,858,834 B2 | 12/2010 | Powers | |
| 7,871,457 B2 | 1/2011 | Shah et al. | |
| 7,959,897 B2 | 6/2011 | Cui et al. | |
| 7,972,498 B2 | 7/2011 | Buchanan et al. | |
| 7,973,087 B2 | 7/2011 | Kibby et al. | |
| 8,198,338 B2 | 6/2012 | Shulenberger et al. | |
| 8,518,151 B2 | 8/2013 | Tessier et al. | |
| 8,563,185 B2 | 10/2013 | Assink et al. | |
| 8,585,802 B2 | 11/2013 | Keller | |
| 8,597,383 B2 | 12/2013 | Pham et al. | |
| 8,726,983 B2 | 5/2014 | Khan | |
| 8,828,121 B1 | 9/2014 | He et al. | |
| 8,900,546 B2 | 12/2014 | Van De Graaf et al. | |
| 8,931,347 B2 | 1/2015 | Donzier et al. | |
| 9,085,497 B2 | 7/2015 | Jennings | |
| 9,096,806 B2 | 8/2015 | Abba et al. | |
| 9,138,718 B2 | 9/2015 | Li et al. | |
| 9,242,230 B2 | 1/2016 | Moon et al. | |
| 9,255,230 B2 | 2/2016 | Shafi et al. | |
| 9,279,088 B2 | 3/2016 | Shafi et al. | |
| 9,284,497 B2 | 3/2016 | Bourane et al. | |
| 9,284,502 B2 | 3/2016 | Bourane et al. | |
| 9,296,961 B2 | 3/2016 | Shafi et al. | |
| 9,328,035 B1 | 5/2016 | Kuhn et al. | |
| 9,493,350 B2 | 11/2016 | Morico et al. | |
| 9,752,080 B2 | 9/2017 | Christensen et al. | |
| 9,863,244 B2 | 1/2018 | Donzier et al. | |
| 9,952,192 B2 | 4/2018 | Donzier et al. | |
| 10,357,759 B2 | 7/2019 | D'Souza et al. | |
| 10,472,951 B2 | 11/2019 | Donzier et al. | |
| 10,527,751 B2 | 1/2020 | Donzier et al. | |
| 2002/0098394 A1 | 7/2002 | Keefer et al. | |
| 2003/0041519 A1 | 3/2003 | Maruko | |
| 2003/0129109 A1 | 7/2003 | Bronicki | |
| 2003/0172589 A1 | 9/2003 | Krueger | |
| 2004/0120889 A1 | 6/2004 | Shah et al. | |
| 2005/0045034 A1 | 3/2005 | Paglieri et al. | |
| 2005/0109037 A1 | 5/2005 | Deckman et al. | |
| 2005/0109821 A1 | 5/2005 | Li | |
| 2005/0211603 A1 | 9/2005 | Guillaume et al. | |
| 2005/0217479 A1 | 10/2005 | Hale et al. | |
| 2006/0013759 A1 | 1/2006 | Jiang et al. | |
| 2006/0057060 A1 | 3/2006 | Sun et al. | |
| 2006/0124445 A1 | 6/2006 | Labrecque et al. | |
| 2007/0157517 A1 | 6/2007 | Tsay et al. | |
| 2007/0180991 A1 | 8/2007 | Chellappa et al. | |
| 2008/0001645 A1 | 1/2008 | Kuroki | |
| 2008/0011644 A1 | 1/2008 | Dean et al. | |
| 2008/0011645 A1 | 1/2008 | Dean | |
| 2008/0019902 A1* | 1/2008 | Rei ..................... C01B 3/38 423/652 |
| 2008/0083648 A1 | 4/2008 | Bishop et al. | |
| 2008/0194900 A1 | 8/2008 | Bhirud | |
| 2008/0277314 A1 | 11/2008 | Halsey | |
| 2008/0283445 A1 | 11/2008 | Powers | |
| 2009/0050523 A1 | 2/2009 | Halsey | |

(56) References Cited

U.S. PATENT DOCUMENTS

| | | |
|---|---|---|
| 2009/0123364 A1 | 5/2009 | Forsyth et al. |
| 2009/0155650 A1 | 6/2009 | Cui et al. |
| 2010/0089795 A1 | 4/2010 | Fujiyama et al. |
| 2010/0137458 A1 | 6/2010 | Erling |
| 2010/0260657 A1 | 10/2010 | Niitsuma et al. |
| 2011/0076225 A1 | 3/2011 | Shah et al. |
| 2011/0083996 A1 | 4/2011 | Shafi et al. |
| 2011/0177410 A1 | 7/2011 | Assink et al. |
| 2011/0247500 A1 | 10/2011 | Akhras et al. |
| 2012/0111051 A1 | 5/2012 | Kulkarni et al. |
| 2012/0118011 A1 | 5/2012 | Terrien et al. |
| 2012/0168154 A1 | 7/2012 | Chinn et al. |
| 2012/0195824 A1 | 8/2012 | Van De Graaf et al. |
| 2012/0258037 A1 | 10/2012 | Pham et al. |
| 2012/0323059 A1 | 12/2012 | Liu et al. |
| 2013/0129610 A1 | 5/2013 | Kale |
| 2013/0156685 A1 | 6/2013 | Vauk et al. |
| 2013/0220884 A1 | 8/2013 | Bourane et al. |
| 2013/0233766 A1 | 9/2013 | Shafi et al. |
| 2013/0248419 A1 | 9/2013 | Abba |
| 2014/0170061 A1 | 6/2014 | Chaubey et al. |
| 2014/0363345 A1 | 12/2014 | Li et al. |
| 2015/0037246 A1 | 2/2015 | Morico et al. |
| 2015/0240717 A1 | 8/2015 | Starcher et al. |
| 2015/0290575 A1 | 10/2015 | Rothermel et al. |
| 2016/0214859 A1 | 6/2016 | Beltramini et al. |
| 2016/0264886 A1 | 9/2016 | Davydov |
| 2016/0325990 A1 | 11/2016 | Galloway |
| 2016/0340187 A1 | 11/2016 | Said et al. |
| 2017/0050845 A1 | 2/2017 | Lofberg et al. |
| 2018/0079643 A1 | 3/2018 | Mortensen et al. |
| 2018/0119026 A1 | 5/2018 | Kinzl et al. |
| 2018/0148655 A1 | 5/2018 | Low et al. |
| 2018/0187106 A1 | 7/2018 | Abudawoud et al. |
| 2018/0187107 A1 | 7/2018 | Abudawoud et al. |
| 2018/0312767 A1 | 11/2018 | Al-Sayed et al. |
| 2018/0370796 A1 | 12/2018 | Mokheimer et al. |
| 2019/0003303 A1 | 1/2019 | Donzier et al. |
| 2019/0112535 A1 | 4/2019 | Kinzl et al. |
| 2019/0135624 A1 | 5/2019 | Mair |
| 2019/0376821 A1 | 12/2019 | Donzier et al. |
| 2021/0309515 A1 | 10/2021 | Younes et al. |
| 2021/0395083 A1 | 12/2021 | Harale et al. |
| 2021/0395085 A1 | 12/2021 | Paglieri et al. |

FOREIGN PATENT DOCUMENTS

| | | | |
|---|---|---|---|
| AU | 2005287034 | 3/2006 | |
| AU | 2010291148 | 3/2011 | |
| AU | 2012243063 | 10/2012 | |
| CA | 2458314 | 4/1999 | |
| CA | 2580580 | 3/2006 | |
| CA | 2580585 | 3/2006 | |
| CA | 2547011 | 8/2008 | |
| CA | 2414657 | 5/2011 | |
| CA | 2938299 | 5/2015 | |
| CN | 104098071 | 10/2014 | |
| CN | 102482079 | 5/2016 | |
| CN | 103596671 | 6/2016 | |
| CN | 105197887 | 3/2017 | |
| CN | 105776133 | 11/2017 | |
| EP | 130933 | 9/1987 | |
| EP | 684066 | 11/1995 | |
| EP | 1024111 | 8/2000 | |
| EP | 1294637 | 3/2003 | |
| EP | 1789171 | 5/2007 | |
| EP | 1789172 | 5/2007 | |
| EP | 1829821 | 9/2007 | |
| EP | 2035329 | 3/2009 | |
| EP | 909804 | 9/2010 | |
| EP | 2696966 | 2/2014 | |
| EP | 2825503 | 1/2015 | |
| EP | 2473441 | 8/2018 | |
| FR | 2943657 | 3/2009 | |
| JP | H06345405 | 12/1994 | |
| JP | H06345405 A | * 12/1994 | |
| JP | H09278403 | 10/1997 | |
| JP | 2943657 | 8/1999 | |
| JP | 2001348205 | 12/2001 | |
| JP | 2004502623 | 1/2004 | |
| JP | 2004249264 | 9/2004 | |
| JP | 2004352528 | 12/2004 | |
| JP | 2007190455 | 8/2007 | |
| JP | 2008513337 | 5/2008 | |
| JP | 2008513338 | 5/2008 | |
| JP | 4381033 | 10/2009 | |
| JP | 2010266155 | 11/2010 | |
| JP | 2011195352 | 10/2011 | |
| JP | 2011195387 | 10/2011 | |
| JP | 2011206612 | 10/2011 | |
| JP | 2013503807 | 2/2013 | |
| JP | 5390448 | 10/2013 | |
| JP | 5588581 | 8/2014 | |
| JP | 2014519463 | 8/2014 | |
| JP | 5611627 | 9/2014 | |
| JP | 2014169222 | 9/2014 | |
| JP | 6040701 | 12/2016 | |
| JP | 6345406 | 6/2018 | |
| NO | 200701530 | 4/2007 | |
| NO | 200701532 | 6/2007 | |
| TW | 200619136 | 6/2006 | |
| TW | 200630158 | 9/2006 | |
| WO | 2000009633 | 2/2000 | |
| WO | 2001064577 | 9/2001 | |
| WO | 2002002460 | 1/2002 | |
| WO | 2002070402 | 9/2002 | |
| WO | 2004041714 | 5/2004 | |
| WO | 2005051590 | 6/2005 | |
| WO | 2006034086 | 3/2006 | |
| WO | 2006034100 | 3/2006 | |
| WO | 2006034103 | 3/2006 | |
| WO | WO-2006034103 A1 | * 3/2006 | ........... B01D 53/228 |
| WO | 2006082933 | 8/2006 | |
| WO | 2006097703 | 9/2006 | |
| WO | 2007031713 | 3/2007 | |
| WO | 2008000782 | 1/2008 | |
| WO | WO 2009013455 | 1/2009 | |
| WO | 2009073436 | 6/2009 | |
| WO | 2010009077 | 1/2010 | |
| WO | 2010009082 | 1/2010 | |
| WO | 2010009089 | 1/2010 | |
| WO | 2010109106 | 9/2010 | |
| WO | 2010143783 | 12/2010 | |
| WO | 2011026943 | 3/2011 | |
| WO | 2012006429 | 1/2012 | |
| WO | 2012142009 | 10/2012 | |
| WO | 2012143096 | 10/2012 | |
| WO | 2012158673 | 11/2012 | |
| WO | 2013137720 | 9/2013 | |
| WO | 2015128045 | 9/2013 | |
| WO | 2015183200 | 12/2015 | |
| WO | 2016207892 | 12/2016 | |
| WO | 2018226617 | 12/2018 | |
| ZA | 2012001141 | 10/2012 | |

OTHER PUBLICATIONS

Amo et al., "Low-Quality Natural Gas Sulfur Removal/Recovery," Membrane Technology and Research, DOE Report DE-AC21-92MC28133—01, Jan. 29, 1998, 107 pages.

Aschoundong et al., "Silane Modification of Cellulose Acetate Dense Films as Materials for Acid Gas Removal Macromolecules," Macromolecules, vol. 46, No. 14, Jul. 9, 2013, 11 pages.

Belov et al., "Gas transport and free volume in hexafluoropropylene polymers," Journal of Membrane Science, vol. 383, Nov. 2011, 8 pages.

Bernardo et al., "Gas transport properties of Pebax/room temperature ionic liquid gel membranes," Separation and Purification Technology vol. 97, Sep. 2012, 13 pages.

Bhide et al., "Hybrid processes for the removal of acid gases from natural gas," Journal of Membrane Science, vol. 140, Issue 1, Mar. 4, 1998, 2 pages, Abstract Only.

(56) References Cited

OTHER PUBLICATIONS

Chatterjee et al., "Poly(ether urethane) and poly(ether urethane urea) membranes with high $H_2S/CH_4$ selectivity," Journal of Membrane Science, vol. 135, No. 99, Nov. 1997, 8 pages.

Jansen et al., "On the unusual solvent and the effect on the gas transport in perfluorinated Hyflon AD Membranes," Journal of Membrane Science, vol. 287, Issue 1, Jan. 2007, 6 pages.

Kraftschik et al., "Dense film polyimide membranes for aggressive sour gas feed separations," Journal of Membrane Science vol. 428, Feb. 1, 2013, 12 pages.

Lallemand et al., "Extending the treatment of highly sour gases: cryogenic distillation," Digital Refining: Processing, Operations & Maintenance, Jan. 2014, 8 pages.

Lallemand et al., "Highly sour gas processing: Bulk removal with SPREX Process," IPTC-10581-MS, International Petroleum Technology Conference, Nov. 2005, 18 pages.

Lallemand et al., "Solutions for the treatment of highly sour gases," Digital Refinding: Processing, Operations & Maintenance, Apr. 2012, 14 pages.

Lockhart, "Sour oil and gas management: 3.3," vol. Lii/New Developments: Energy, Transport, Sustainability Encyclopedia of Hydrocarbons, 2007, 34 pages.

Lokhandwala et al., "Membrane separation of nitrogen from natural gas: A case study from membrane synthesis to commercial deployment," Journal of Membrane Science 346, Jan. 2010, 10 pages.

Merkel and Toy, "Comparison of Hydrogen Sulfide Transport Properties in Fluorinated and Nonfluorinated Polymers," Macromolecules, vol. 39, No. 22, Sep. 2006, 10 pages.

Mori et al., "Reactor configuration and concentration polarization in methane steam reforming by a membrane reactor with a highly hydrogen-permeable membrane," Industrial & Engineering Chemistiy Research, Feb. 2007, 46(7): 1952-1958.

Oi et al., "Simulation and cost comparison of CO2 liquefaction," Energy Procedia, 2016, 86:500-510.

Robeson, "The upper bound revisited," Journal of Membrane Science, vol. 320, Jul. 15, 2008, 11 pages.

Rufford et al., "The removal of CO2 and N2 from natural gas: A review of conventional and emerging process technologies," Journal of Petroleum Science and Engineering, vol. 94-95, Sep. 2012, 32 pages.

Wismann et al., "Electrified methane reforming: A compact approach to greener industrial hydrogen production," Science Magazine, May 2019, 364(6442): 756-759.

Xu et al., "An Improved CO2 Separation and Purification System Based on Cryogenic Separation and Distillation Theory," Energies ISSN 1996-1073, May 2014, 7: 3484-3502.

PCT International Search Report and Written Opinion in International Appln. No. PCT/US2021/024865, dated Jun. 28, 2021, 13 pages.

Alvarez et al., "Ru—Ni catalyst in the combined dry-stream reforming of methane: the importance in the metal order addition," Topics in Catalysts, Jul. 2015, 59(2):303-313, 11 pages.

Boeltken et al., "Ultra-compact microstructured methane steam reformer with integrated Palladium membrane for on-site production of pure hydrogen: Experimental demonstration," International Journal of Hydrogen Energy, Elsevier Science Publishers, Jul. 2014, 39(31):18058-18068, 11 pages.

Chen et al., "Hydrogen production from the steam reforming of liquid hydrocarbons in membrane reactor," Catalysis Today, Elsevier, Oct. 2006, 118(1-2):136-143, 8 pages.

PCT International Search Report and Written Opinion in International Appln. No. PCT/US2021/036849, dated Sep. 13, 2021, 14 pages.

PCT International Search Report and Written Opinion in International Appln. No. PCT/US2021/036848, dated Sep. 13, 2021, 15 pages.

PCT International Search Report and Written Opinion in International Appln. No. PCT/US2021/036850, dated Sep. 13, 2021, 15 pages.

Rohland et al., "Electrochemical hydrogen compressor," Electrochinnica Acta, 1998, 43(24):3841-3846, 6 pages.

\* cited by examiner

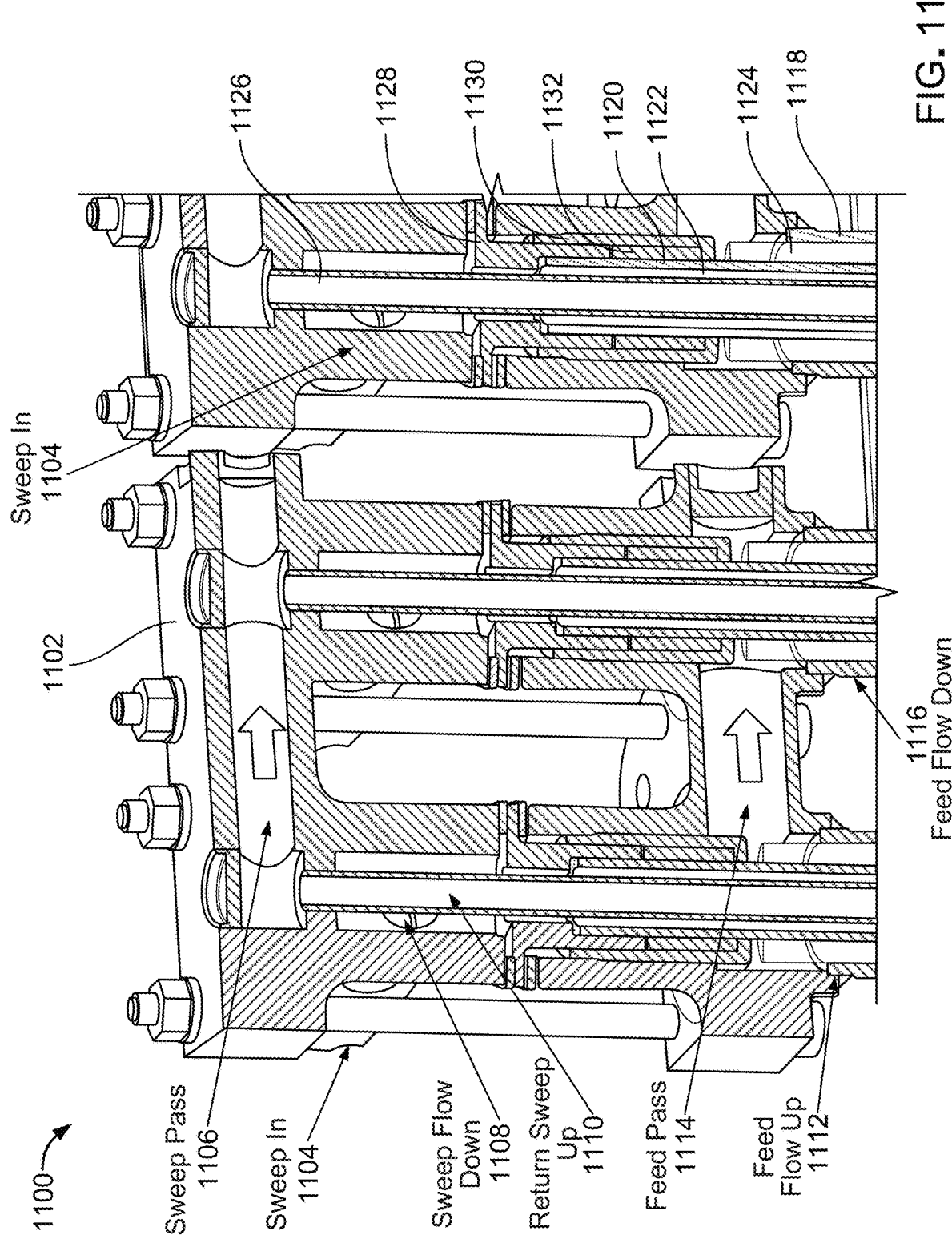

US 11,583,824 B2

HYDROGEN PRODUCTION WITH MEMBRANE REFORMER

TECHNICAL FIELD

This disclosure relates to reforming hydrocarbon to produce hydrogen.

BACKGROUND

Hydrogen can be produced from fossil fuels. Hydrogen is commercially produced, for example, through reforming of hydrocarbons or electrolysis of water. Hydrogen is produced by coal gasification, biomass gasification, water electrolysis, or the reforming or partial oxidation of natural gas or other hydrocarbons. The produced hydrogen can be a feedstock to chemical or electrochemical processes, such as fuel cells, ammonia production, aromatization, hydrodesulfurization, and the hydrogenation or hydrocracking of hydrocarbons.

The reforming of natural gas is the most prevalent source of hydrogen production. Bulk hydrogen is typically produced by the steam reforming of natural gas (methane). Conventional steam reforming includes heating the natural gas (e.g., to between 700° C. to 1100° C.) in the presence of steam and a nickel catalyst. This endothermic reaction generates carbon monoxide and hydrogen. The carbon monoxide gas can be subjected to a water-gas shift reaction to obtain additional hydrogen.

SUMMARY

An aspect relates to a membrane reformer to produce hydrogen. The membrane reformer includes multiple membrane reactors. Each membrane reactor includes: (1) a feed conduit as an outer conduit of the membrane reactor to receive hydrocarbon and steam into a region external to a tubular membrane in the feed conduit; and (2) catalyst (including steam-reforming catalyst) disposed in the region in the feed conduit external to the tubular membrane to convert the hydrocarbon into hydrogen and carbon dioxide; and (3) the tubular membrane in the feed conduit to diffuse the hydrogen from the region through the tubular membrane to a bore of the tubular membrane. The region is a retentate side of the tubular membrane and discharges retentate including carbon dioxide. The bore is a permeate side of the tubular membrane and discharges permeate including hydrogen. Each membrane reactor has an insertion tube disposed in the bore to facilitate flow of sweep gas through the bore in a direction countercurrent to flow of hydrocarbon and steam in the region external to the tubular membrane.

Another aspect relates to a method of producing hydrogen. The method includes providing hydrocarbon and steam to a membrane reformer having multiple membrane reactors. The method includes converting the hydrocarbon to hydrogen and carbon dioxide via catalyst (including steam-reforming catalyst) disposed external to tubular membranes in the multiple membrane reactors. The method includes diffusing hydrogen through the tubular membranes in the multiple membrane reactors to respective bores of the tubular membranes. The method includes flowing a sweep gas through the respective bores to displace hydrogen in a direction countercurrent to flow of hydrocarbon and steam external to the tubular membranes. The method includes discharging hydrogen as permeate with the sweep gas from the respective bores, and discharging carbon dioxide external to the tubular membranes as retentate from the multiple membrane reactors.

Yet another aspect is a method of hydrogen generation. The method includes producing hydrogen with a membrane reformer having multiple membrane reactors. Each membrane reactor has an outer tube and a tubular membrane in the outer tube. The producing of the hydrogen for each membrane reactor includes: (1) converting hydrocarbon into hydrogen and carbon dioxide in a region in the outer tube external to the tubular membrane in presence of steam via catalyst (including reforming catalyst) disposed in the region; (2) diffusing hydrogen from the region through the tubular membrane into a bore of the tubular membrane, wherein the region is a retentate side of the tubular membrane, and wherein the bore is a permeate side of the tubular membrane; (3) discharging carbon dioxide from the region; (4) flowing a sweep gas through the bore to displace hydrogen from the bore in a direction countercurrent to flow of the hydrocarbon in the region external to the tubular membrane; and (5) discharging hydrogen and sweep gas from the bore.

The details of one or more implementations are set forth in the accompanying drawings and the description below. Other features and advantages will be apparent from the description and drawings, and from the claims.

BRIEF DESCRIPTION OF DRAWINGS

FIG. 7-11 are diagrams of membrane reformers.

DETAILED DESCRIPTION

Figure 1:
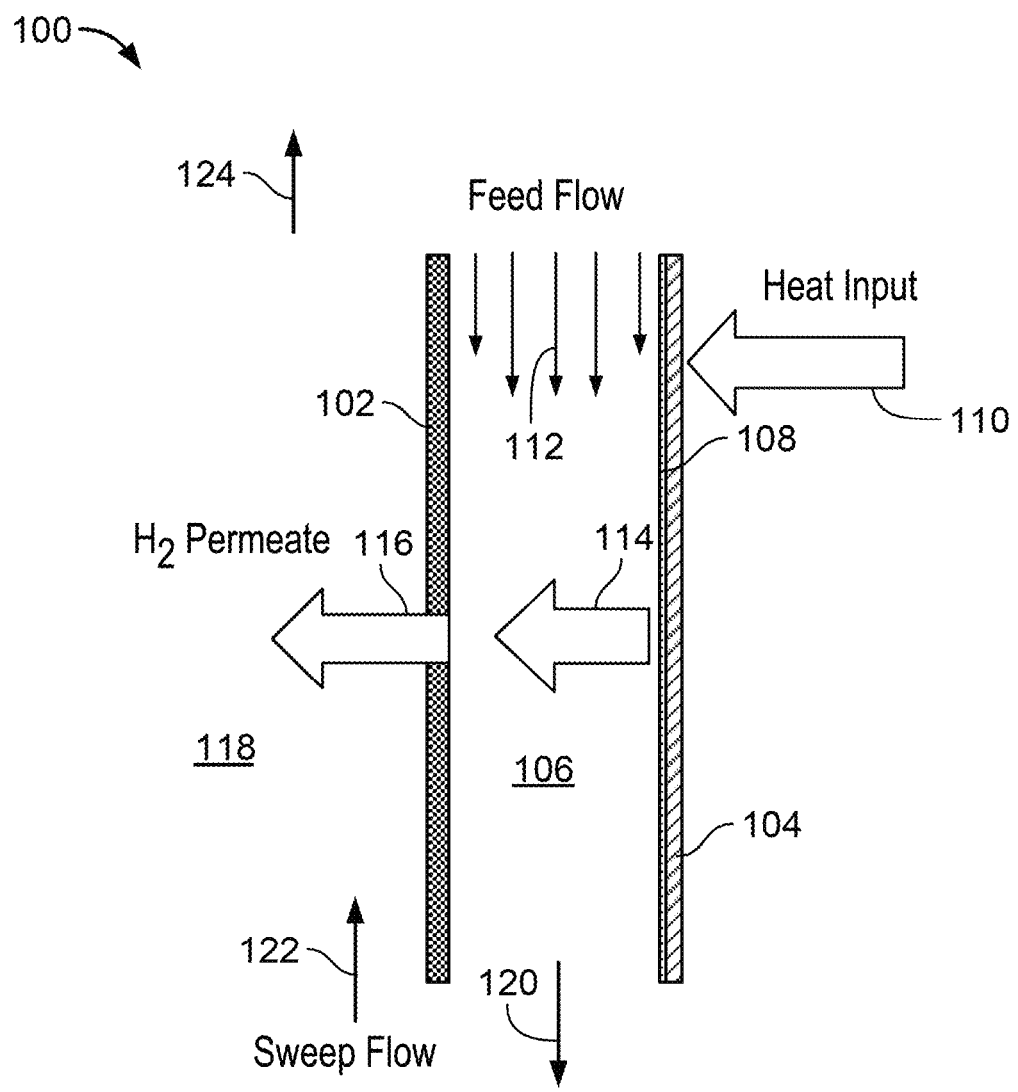
FIGS. 1-5 are diagrams of membrane reactors.

A prevalent large-scale route to produce hydrogen is steam methane reforming (SMR) of natural gas at high temperature (e.g., 800° C. to 900° C.) and high pressure (e.g., 15 bar to 40 bar) via a nickel-based catalyst in alloy tubes in a furnace. This conventional SMR is typically optimized for large-scale hydrogen production and generally does not scale down effectively for small-scale hydrogen production. Furthermore, the efficiency of the large-scale industrial SMR process depends on turning the waste heat from the furnace exhaust into steam for use in other areas of the plant or facility. Such makes the process less efficient when scaled down for applications that have no use for the waste heat that is generated. In this instance, the waste heat is dissipated, often with active cooling that consumes even more energy.

Some aspects of the present disclosure are directed to steam reforming that is accompanied by hydrogen separation through hydrogen-selective membranes as permeate with retentate left under pressure. The retentate may include primarily $CO_2$ and also water vapor, unconverted methane, CO, and the remaining hydrogen. Thus, the process may be hydrogen generation by steam reforming, and with hydrogen separation and $CO_2$ capture via high-temperature hydrogen membranes.

Therefore, aspects are directed to a catalytic membrane reactor with hydrogen-selective membranes to produce hydrogen. The catalytic membrane reactors may be employed as module units in modules of multiple catalytic membrane reactors in an overall membrane reformer.

The hydrogen-selective membranes may facilitate to increase both the yield and recovery of hydrogen from an equilibrium-limited reaction such as steam methane reforming. The membrane reactor may operate at lower temperature and be compact compared to a conventional SMR system. Utilization of the hydrogen-selective membranes facilitates production of relatively pure hydrogen and a concentrated capture-ready carbon dioxide stream for utilization or sequestration. The membrane reactor (membrane reformer) may reform methane (natural gas) or liquid hydrocarbon feeds and produce high-purity hydrogen while separating CO2. The membrane reactor may include hydrogen-selective membranes (e.g., palladium or palladium-alloy) along with a high-activity steam reforming catalyst. The membrane reactor may operate, for example, at operating conditions of 450° C. to 600° C. and 10 bar to 50 bar, as compared to operating conditions of 850-900° C. and 10-40 bar in conventional steam-reforming processes. In implementations, the membrane reformer has significantly higher efficiency in producing the hydrogen while also lower capital and operating costs, as compared to conventional SMR.

The feed gas may be a pressurized mixture of steam and hydrocarbons fed to the space in the reactor external to the tubular membrane. This space may be a reaction space. This space may be the retentate side and high-pressure side of the membrane. The hydrocarbons may include, for example, methane, liquefied petroleum gas (LPG), a mixture of C1-C6, and so on. The feed gas enters the space external to the membrane and reacts to generate hydrogen that is withdrawn from the reaction space through the membrane to the permeate side (lower pressure side). The pressurized carbon-dioxide rich stream produced on the retentate side of the membrane may facilitate capture of the carbon dioxide. A sweep gas (such as steam or nitrogen) may be utilized to increase the driving force for hydrogen permeation through the membrane. Sweep gas may be fed into the membrane lumen utilizing a tube inside the membrane tube (see, e.g., FIGS. 3-5 and 7). Sweep gas may be fed to flow in the lumen countercurrent to the flow direction of the reactants (hydrocarbon and steam) external to the tubular membrane to obtain greater driving force for hydrogen permeation.

The catalyst in the membrane reactor may be in the form of pellets or granules, or disposed in a metal foam. The catalyst may be a washcoat on the inside surface of the reactor tubular vessel. In implementations, the catalyst does not contact the membranes so to avoid deactivation or scratching the surface of the membrane material and thus promote the lifetime of the membrane material (e.g., palladium alloy). The gap (distance) between the catalyst and the membrane may be relatively small to promote diffusion of the hydrogen (generated by the reaction) through the membrane.

FIG. 1 is a catalytic membrane reactor 100 for steam reforming hydrocarbon (e.g., natural gas or methane) to generate hydrogen. The catalytic membrane reactor 100 may be labeled as a catalytic membrane reformer. For clarity, the right portion of the reactor 100 is depicted. The left portion (not shown) mirrors the right portion.

The reactor 100 has a hydrogen-selective tubular membrane 102 in a feed tube 104 (feed conduit). The annulus 106 is the reaction space for the reforming reaction and is the retentate side of the tubular membrane 102. Reforming catalyst 108 is disposed on the inside surface of the feed tube 104. The feed tube 104 may be the outer tube (outer conduit) of the reactor 100. The outside surface of the feed tube 104 may be the outside surface of the reactor 100.

The reactor 100 may include a heat source 110 to provide heat for the endothermic reforming reaction. For example, the heat source 110 may be electrical heaters disposed on the outside surface of the feed tube 104. The heat source 110 can be the feed tube 104 via an electrical current flowed through the feed tube 104 for electrical resistive heating. In some examples, the heat source 110 may be electrical resistive heaters (e.g., electrical cartridge heaters) disposed as internal heaters in the annulus 106.

In operation, feed 112 is provided to the annulus 106. The feed may include hydrocarbon (e.g., methane) and steam (H2O). In the annulus 106, the hydrocarbon is converted by reforming via the catalyst 108 into hydrogen (H2) and carbon dioxide (CO2). The reforming catalyst 108 may additionally include water-gas shift (WGS) catalyst to facilitate converting carbon monoxide (CO) formed into CO2 and H2 in a WGS reaction in the annulus 106.

The hydrogen 114 generated may diffuse through the tubular membrane 102 wall (membrane material) as hydrogen permeate 116 into the bore 118 (lumen) of the tubular membrane 102. The bore 118 is the permeate side of the tubular membrane 102. In implementations, the operating pressure of the annulus is in a range of 10 bar to 50 bar. The unit "bar" as used herein is bar in absolute pressure (bara). Retentate 120 (e.g., primarily CO2) may discharge from the annulus 106. In implementations, sweep gas 122 (e.g., steam or nitrogen) is introduced into (flowed through) the bore 118 to displace the hydrogen permeate 116. The operating pressure of the bore 118 (permeate side of the membrane 102) and flowing sweep gas 122 may be maintained, for example, in a range of 1 bar to 5 bar, or in a range of 2 bar to 3 bar, or at less than 3 bar. The countercurrent flow of the sweep gas 122 relative to the retentate 120 to displace the permeate 116 may advance diffusion (increase driving force of the permeation) of the hydrogen 114 through the membrane 102 wall as permeate 116 into the bore 118. Hydrogen product 124 including hydrogen permeate 116 and sweep gas 122 may discharge from the bore 118. For the sweep gas 122 as steam, the steam may typically be readily removed from the hydrogen product 124 via condensation of the steam into liquid water via a downstream condenser (e.g., heat exchanger).

In a pilot-plant example, a single-tube membrane reactor gave greater than 90% conversion of methane to hydrogen at a reactor operating temperature in a range of 500° C. to 575° C. (e.g., about 550° C.). Addition of a second membrane in series inside the same reactor (downstream of the first membrane) can give a conversion of the methane to hydrogen approaching 100% (e.g., conversion of at least 98%, at least 99%, or at least 99.5%). The addition of the second membrane was also beneficial in providing for further purification of the carbon dioxide in the retentate by extracting nearly all of the remaining hydrogen from the retentate.

The membrane reactor generates hydrogen via the steam reforming and contemporaneously membrane-separates the hydrogen (as permeate). The membrane reactor produces CO2 via the steam reforming and separates the CO2 in-situ (as membrane retentate). The steam reforming reaction may include at least $CH_4 + H_2O = CO + 3H_2$. In addition to the steam reforming, WGS reaction [$CO + H_2O = CO_2 + H_2$] may be involved in the membrane reactor in the generation of CO2 and H2. The WGS reaction is a reversible shift reaction that is mildly exothermic. Conditions in the present membrane reactors that may be beneficial for WGS include: (a)

the conversion of hydrocarbon to CO and H2 is generally high in the reforming reaction; (b) H2O is used in conversion and most of the H2 is removed (no thermodynamic conversion limitation); and (3) WGS reaction kinetics are rapid at elevated temperatures (above 320° C.) and the WGS conversion of CO generally may happen at a faster rate in the membrane reactor than in a conventional catalytic reactor.

Figure 2:
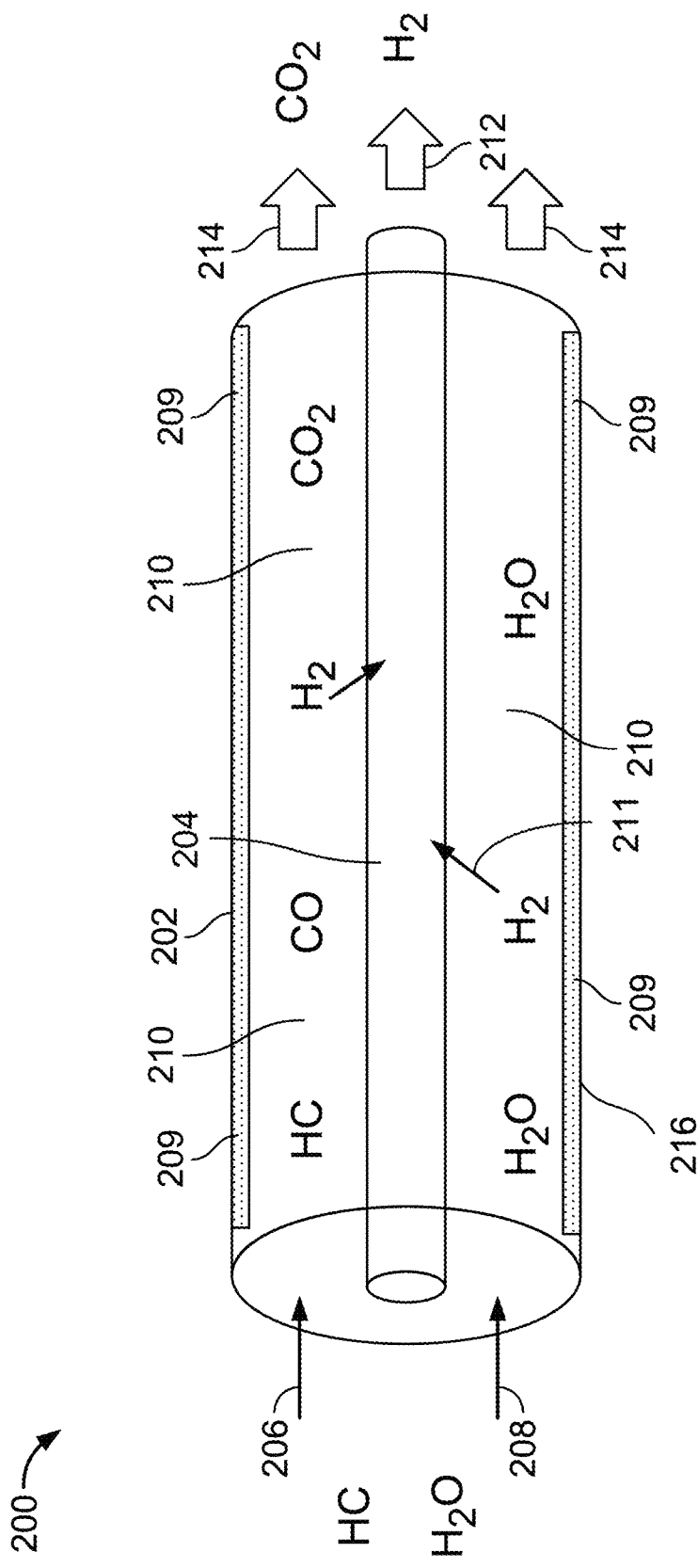

FIG. 2 indicates a membrane reformer practice where a hydrogen-selective membrane is integrated with a reforming catalyst bed. The hydrogen-selective membrane facilitates to continuously remove hydrogen as the hydrogen is being produced. The simultaneous generation and separation of hydrogen eliminates or reduces the limitation of thermodynamic equilibrium. The reaction can be performed at lower temperature (e.g., 500° C. to 600° C.) compared to the temperature (e.g., 850° C. to 950° C.) in conventional steam reforming. The implementation can result in process intensification by combining reaction, separation, and purification (e.g., initial purification) in a single unit (the membrane reactor).

The CO generated in the reforming process can be converted to CO2 in the membrane reformer reactor. Through process intensification, the WGS reaction can also take place in the membrane reformer. With excess H2O, the overall reaction proceeds to CO2 and H2 (e.g., via CH4+2H2O=CO2+4H2); the WGS reaction converts CO+H2O=CO2+H2 in the membrane reformer.

In implementations, the membrane reformer can be configured more compactly and efficiently than the conventional SMR process. Another advantage of the membrane reformer system can be generally the high concentration of CO2 in the retentate (concentrations as high as 90 mole percent on a dry basis), which may reduce the energy and cost penalty associated with CO2 capture.

FIG. 2 is a simplified perspective view of a catalytic membrane reactor 200 (reformer) including a feed tube 202 (feed conduit) and a hydrogen-selective tubular membrane 204 (membrane tube) disposed (e.g., concentrically) in the feed tube 202. Thus, the reactor 200 may be characterized as having a tube-in-tube configuration. The feed tube 202 may be analogous the feed tube 104 discussed with respect to FIG. 1. The tubular membrane 204 may be analogous to the tubular membrane 102 discussed with respect to FIG. 1.

The feed tube 202 may be a conduit or tubing that is an outer conduit or outer tube of the reactor 200. The feed tube 202 may be labeled as a reactor vessel that is cylindrical or tubular. The feed tube 202 may be tubing (tubular conduit) rated for internal pressure per an applicable industry standard. The feed tube 202 may have a horizontal orientation (as depicted) or a vertical orientation.

The tubular membrane 204 may share a longitudinal axis or central axis with the feed tube 202, as depicted. The tubular membrane 204 may be disposed concentrically in the feed tube 202, as depicted. Other configurations are applicable. The membrane reactor 200 may have multiple tubular membranes 204 disposed in the feed tube 202. For instance, multiple tubular membranes 204 may be disposed parallel (sharing the same longitudinal axis) in the feed tube 202.

The membrane material of the tubular membrane 204 may be, for example, palladium or palladium alloy. The membrane 204 selectivity towards hydrogen is typically greater than 1000 (dimensionless—a ratio of the same parameter) with selectivity being the ratio of hydrogen flux to the flux of other gases, e.g., nitrogen (N2), through the membrane 204. The hydrogen-selective tubular membrane 204 may be hydrogen selective in having a hydrogen flux of at least 250 standard cubic feet per hour per square foot (SCFH/ft$^2$) at a pressure differential ($\Delta$P) of 100 pounds per inch (psi) and with H2 partial pressure at 400° C. The hydrogen-to-nitrogen selectivity can be a flux ratio of at least 50 at 300° C. and a transmembrane pressure of 5 bar.

The feed tube 202 may be, for example, stainless steel. Other materials of construction are applicable. For embodiments where the wall of the feed tube 202 is an electrical resistive heater, the feed tube 202 may a metallurgy other than stainless steel, as discussed below.

In operation, hydrocarbon 206 and steam 208 are fed to the feed tube 202. The feed may be introduced into the region 210 in the feed tube 202 that can include the annulus between the wall of the feed tube 202 and the tubular membrane 204. The hydrocarbon 206 is subjected to steam reforming via catalyst 209 in the feed tube 202 to generate hydrogen and carbon dioxide in the feed tube 202. The catalyst 209 includes reforming catalyst. In some implementations, the steam reforming may primarily generate synthesis gas (CO and H2). Water-gas shift reaction with the presence of steam converts CO to CO2 and H2. With greater stoichiometric amounts of water or steam fed to the reformer reactor 200, the overall reaction can more directly go to CO2 and H2 with intervening CO generated in some conditions.

In certain implementations, the catalyst 209 in the membrane reformer reactor 200 includes a layered catalyst with steam reforming catalyst and water-gas shift reaction catalyst. With this layered catalyst and lower operating temperatures (e.g., compared to conventional SMR), the water-gas shift has higher equilibrium conversion (and is a mildly exothermic reaction): CH4+H2O=CO+3H2 and CO+H2O=CO2+H2 giving overall reaction CH4+2H2O=CO2+4H2. For catalyst 209, the reforming catalyst and any WGS catalyst may each be nickel, nickel-based, noble metal, noble-metal-based, transition metal, or transition-metal-based.

The steam reforming reaction (including any water-gas shift reaction) occurs in the region 210 in the feed tube 202 external to the tubular membrane 104. This region 210 may be labeled as a reaction space and is the retentate side of the tubular membrane 204. The description of "steam reforming reaction" in the present membrane reactor 200 can be understood to include conversion of CO to CO2 in certain circumstances.

As the steam reforming reaction occurs and the hydrogen is being formed, the hydrogen diffuses 211 (permeates) through the tubular membrane 204 wall into the bore (lumen) of the tubular membrane 204. The wall of the tubular membrane 204 is the membrane, i.e., the membrane material (e.g., palladium or palladium alloy). The bore is the interior space of the tubular membrane 204 and may be labeled as a lumen. The bore of the tubular membrane 204 is the permeate side of the tubular membrane 204. This process intensification in the same unit (reactor 200) includes the reaction via catalyst to produce hydrogen, separation of hydrogen from the carbon dioxide via the membrane 204, and purification of the hydrogen by the separation via the membrane 204.

Permeate 212 rich in hydrogen discharges from the bore of the tubular membrane 204. The permeate 212 may be, for example, at least 90 mole percent (mol %) hydrogen, at least 99.99 mol %, or at least 99.999 mol %. If a sweep gas is employed, these reported mole percentages of the permeate 112 (as discharged from the bore of the membrane 204) are on a basis free of sweep gas (sweep-gas-free basis). In one implementation, permeate 212 discharges at a temperature in range of 500° C. to 600° C. (e.g., about 550° C.), or less than 600° C. or less than 550° C., under a pressure in a range of 1 bar to 6 bar, a range of 2 bar to 4 bar, or a range of 2 bar to 3 bar.

Retentate 214 rich in carbon dioxide ($CO_2$) discharges from the feed tube 202 region 210 (reaction space) that is around and external to the tubular membrane 204. The $CO_2$-rich retentate 214 may generally contain less than 10 mol % of the combination of hydrogen and carbon monoxide. The $CO_2$-rich retentate 214 may typically be at least 90 mol % $CO_2$ (on a dry basis) making the retentate 114 generally ready in certain instances for further compression for geological sequestration or enhanced oil recovery (EOR), or for further purification so that the $CO_2$ can be used as a feedstock for another process. The steam in the retentate 214 may be condensed and removed.

In embodiments, a sweep gas (e.g., steam or nitrogen) is provided to the bore of the tubular membrane 204 to flow through the bore to displace the permeate (hydrogen) from the bore. This displacement of hydrogen may maintain or increase driving force for hydrogen permeation through the tubular membrane 204 wall from the region 210 (reaction space) external to tubular membrane 204 to the bore. In some embodiments, the sweep gas may be provided to flow in a countercurrent direction with respect to entering flow direction of the feed of hydrocarbon 206 and steam 208. The permeate 212 may discharge from the end (hydrocarbon-feed end) opposite the end that the retentate 214 discharges.

In cases where a sweep gas is employed, the hydrogen purity of the permeate 212 may be reported on a sweep-gas-free basis in some instances. If steam is utilized as the sweep gas, the hydrogen purity of the permeate 212 may be reported on a dry basis. In implementations, the steam (water) may be readily removed from the permeate 212 downstream. The permeate 212 may be subjected to dehydration (not shown).

If $N_2$ is utilized as the sweep gas, the hydrogen purity of the permeate 212 may be reported on a $N_2$-free basis in some embodiments. In particular instances, $N_2$ may be employed as a sweep gas for the permeate 212 (hydrogen and nitrogen) routed further for ammonia synthesis, for example. In contrast, for mobility applications of the membrane reactor 200, $N_2$ as a sweep gas may be generally avoided in certain cases.

As mentioned, the catalyst 209 for the steam reforming of the hydrocarbon 206 is disposed in the feed tube 202. The catalyst 209 may be disposed generally in the region 210 (e.g., annulus) between the tubular membrane 204 and the feed tube 202 wall. The catalyst 209 may be disposed at or on the internal (inside) surface 216 of the feed tube 202 wall, as depicted. The catalyst 209 may be a coating (e.g., wash coating) or in structured form (e.g., metal foam). In certain embodiments, the catalyst 209 is not in contact with the tubular membrane 204. In other embodiments, the catalyst 209 may be packed catalyst in the region 210 and can be in contact with the membrane 204.

In embodiments for catalyst 209 disposed at or on the feed tube 202 wall, the wall may be heated to directly heat (via contact) the catalyst 209 to promote and advance the reforming reaction. In some implementations, the catalyst 209 may be disposed on internal resistive heaters if employed. Thus, in those implementations, the internal resistive heaters (e.g., cartridge heaters) may directly heat (via contact) the reforming catalyst to promote and advance the reforming reaction.

Heat may be provided for the reforming reaction by electrical heating. The electrical source for the electrical heaters may be a battery. The electrical source may be a renewable source of energy, such as solar-generated (e.g., solar panels) or wind-generated. The electrical heaters may be external electrical heaters that heat the wall of the feed tube 202, or the wall of the feed tube 202 may be an electrical heater. A heated wall may directly heat via contact the catalyst 209 coated or otherwise disposed at or on the inside surface of the feed tube 202 wall. The electrical heaters may be internal heaters disposed in the feed tube 202, such as in the regions 210. Electrical heating may give a reactor 200 operating temperature up to 800° C. or greater, or at least 550° C. or at least 600° C. In operation, the reactor 200 operating temperature may be in a range of 450° C. to 650° C., or less than 700° C., less than 600° C., or less than 550° C.

Electrical heating may be implemented by heating the feed tube 202 wall with electrical resistive heating. For instance, the feed tube 202 wall itself may be an electrical resistive heater. In other words, an alternating current may be passed through the feed tube 202 wall from the electrical source to generate resistive heating by the feed tube 202 wall. In those implementations, the feed tube 202 may be material that is acceptable as a heating element giving adequate electrical resistance. For example, the feed tube 202 can be a metal alloy such as a nickel-chromium alloy. Heat may be provided for the reforming reaction by external electrical heaters. For example, electrical heaters (not shown), such as electrical band heaters or strip heaters, may be disposed on the external surface of the feed tube 202 or disposed on a metal plate (heat distribution plate) in contact with the external surface of the feed tube 202.

Heat may be provided for the reforming reaction in the feed tube 202 by electrical resistive heaters (not shown) disposed in the annulus (region 210) in the feed tube 202. The resistive heaters disposed in the feed tube 202 may be labeled as internal heaters. In some embodiments, the internal resistive heaters are electrical cartridge heaters. Cartridge heaters are heating elements typically having a cylindrical shape. The cartridge heater (heating element) or other electrical resistive heaters may include a sheath that is an outer metal enclosure (e.g., stainless steel). The internal resistive heater (heating element) may include an insulator and a wire coil (as the heater) that is metal. The heater wire coil may be a metal alloy, such as an alloy of nickel and chromium, or other metal alloy. In operation, an alternating current may be passed through the resistive wire coil in the internal resistive heater to generate resistive heating by the wire coil. This heat energy is transferred from the wire into the metal sheath and then the surrounding area and volume via conduction.

Moreover, in particular implementations, the hydrocarbon 206 (and steam 208) in route to the membrane reactor 200 may be heated via electrical heaters or via a heat transfer medium in heat exchangers. As discussed, example operating temperatures of the reactor 200 at which the reforming reaction may occur can be less than 600° C., or less than 550° C. The operating pressure in the reaction space 210 in the vessel 102 may be, for example, in the range of 20 bar to 50 bar or in the range of 30 bar to 40 bar, or at least 15 bar, at least 25 bar, or at least 35 bar.

In certain embodiments, the inlet portion (section) of the membrane reactor 200 is packed inside the feed tube 202 with hydrocarbon pre-reforming catalyst (e.g., nickel-based, nickel-ruthenium, etc.). The pre-reforming catalyst may facilitate to convert higher hydrocarbon molecules in the hydrocarbon 106 feed into C1 (methane) type compounds, and this methane-rich synthesis gas then flows onward in the feed tube 202 across the catalyst 209 of the membrane reformer 200. Thus, in those embodiments, the membrane reactor 200 may be an integrated pre-reformer and reformer. The portion of the membrane reactor 200 with the feed tube 202 having the pre-reforming catalyst may be characterized as a pre-reformer reactor. The downstream portion of the membrane reactor 200 with the feed tube 202 having the catalyst 209 may be characterized as a reformer reactor. This configuration having pre-reformer reactor portion integrated with the reformer reactor portion may be applicable to the membrane reactor or to the multiple membrane reactors of the reformers presented in subsequent figures.

Lastly, in particular embodiments, a dry reforming catalyst (e.g., noble metal-based or Ni-molybdenum [Ni—Mo] on magnesium oxide [MgO], etc.) is packed towards (near, adjacent, or at) the outlet of the membrane reactor 200. In implementations, the reactor mixture towards the outlet may have a high concentration of carbon species (e.g., $CO_2$, CO, $CH_4$) because a majority of the generated hydrogen has permeated. The mixture may also have unconverted steam (water). This environment rich in carbon species near or at the outlet may be processed via the dry reforming catalyst. A dry reforming catalyst may facilitate to convert remaining $CH_4$ or hydrocarbon by reacting the $CH_4$ (and other hydrocarbon) with $CO_2$ into CO and $H_2$. Dry reforming catalyst may contribute to reduce coke-formation tendency on the membrane 204 surface, as well as advance conversion of remaining hydrocarbons into $H_2$. This configuration having dry reforming catalyst near, adjacent, and/or at the outlet may be applicable to the membrane reactor or to the multiple membrane reactors of the reformers presented in subsequent figures.

Figure 3:
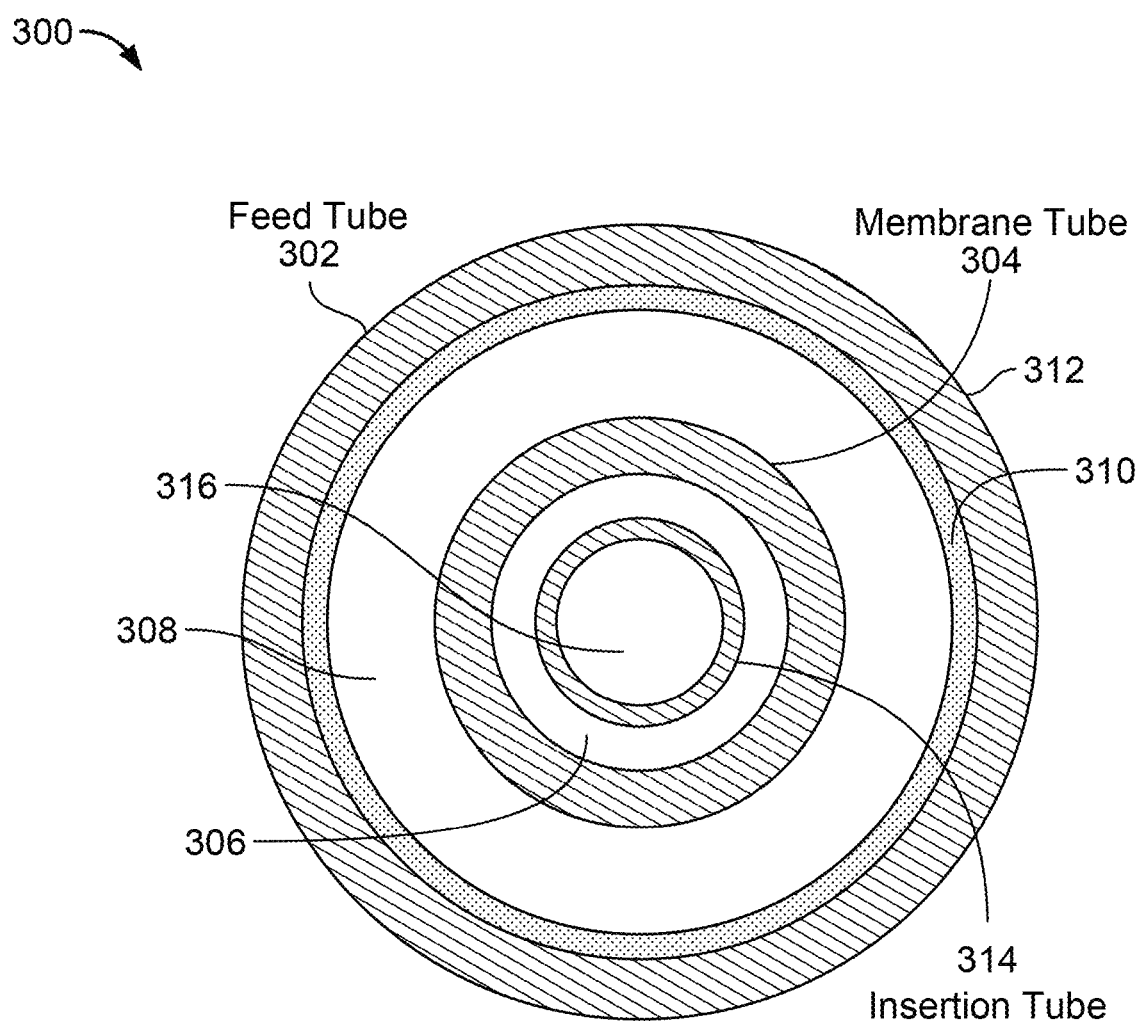

FIG. 3 is a cross-section end-view of a catalytic membrane reactor 300 (reformer) that may be analogous to the membrane reactors 100 and 200 of the previous figures. In the illustrated embodiment, the reactor 300 has a tube-in-tube arrangement. In particular, the reactor 300 includes a feed tube 302 (feed conduit) and a hydrogen-selective tubular membrane 304 (membrane tube) disposed in the feed tube 302. The bore 306 of the tubular membrane 304 may be labeled as a lumen.

The perpendicular distance of the gap (annulus volume) between the feed tube 302 and the tubular membrane 304 may be specified to advance the reforming reaction and permeation of hydrogen through the tubular membrane 204. This gap is generally the region 308 that includes reaction space for the reforming reaction and is the retentate side of the tubular membrane 304.

The feed tube 302 may be tubing that is a cylindrical or tubular conduit and can be labeled as an outer tube or outer conduit. The feed tube 302 may be a pressure vessel rated per an applicable industry standard. The feed tube 302 as a conduit or vessel can accommodate the discussed operating pressures and operating temperatures. In implementations, the feed tube 302 can be considered a reactor 300 vessel housing contents of the reactor 300. In some examples, the feed tube 302 is stainless-steel.

The reactor 300 includes catalyst 310 disposed in the region 308 that is the reaction space. The catalyst 310 is a reforming catalyst and may include WGS catalyst. The catalyst 310 may be disposed on or at the inside surface of the feed tube 302. For example, the inside surface of the feed tube 302 may be coated with the catalyst 310. In implementations, the catalyst 310 can be a structured catalyst, such as catalyst in a foam, mesh, monolith, or microlith. In implementations of the catalyst 310 as a structure catalyst, the catalyst 310 may be foam catalyst, mesh catalyst, monolith catalyst, or microlith catalyst, and the like. The catalyst 310 may be a packed catalyst in the region 308.

The feed tube 302 may be heated by electrical resistance heating. The electrical heating may heat the wall of the feed tube 302 and thus the catalyst 310 and other contents (e.g., reactants) in the feed tube 302 during operation. The electrical heating of the feed tube 302 may provide for the desired operating temperature of the reactor 300.

In certain embodiments, the feed tube 302 is heated directly by external electrical heaters in contact with the outer surface 312 of the feed tube 302. The feed tube 302 may be heated with external electrical heaters by conduction through a metal plate(s) (heat distribution plate) in contact with the outer surface 312 of the feed tube 302. Other electrical heater arrangements are applicable, as discussed with respect to FIG. 2. For instance, the wall of the feed tube 302 may be the heating element of an electrical resistance heater. In those embodiments, the metallurgy of the feed tube 302 may be a metal (e.g., nickel-chromium alloy) other than stainless steel.

The tubular membrane 304 disposed in the feed tube 302 may be a tubular support (e.g., porous ceramic) with hydrogen-selective membrane material disposed on the tubular support. Thus, the wall of the tubular membrane 304 may be the tubular support plus the membrane material. The membrane material of the tubular membrane 304 may be, for example, palladium or palladium alloy. The palladium alloy may be, for example, a palladium-platinum (Pd—Pt) alloy, a palladium-gold (Pd—Au) alloy, a palladium-ruthenium (Pd—Ru) alloy, or tertiary alloys of these elements Pt, Au, or Ru with palladium. In some examples, the membrane material has a thickness of at least 2 microns or at least 3 microns, and in ranges of 2 to 20 microns, 3 to 10 microns, and 3 to 6 microns. The thickness of the membrane material may be less than 30 microns, less than 20 microns, or less than 10 microns. As indicated, the membrane material may be disposed (e.g., deposited) on a tubular substrate such as a dense or porous tubular support that is ceramic or metallic with ceramic interlayer. If so, the wall of the tubular membrane 304 may include the membrane material and the support.

Figure 4:
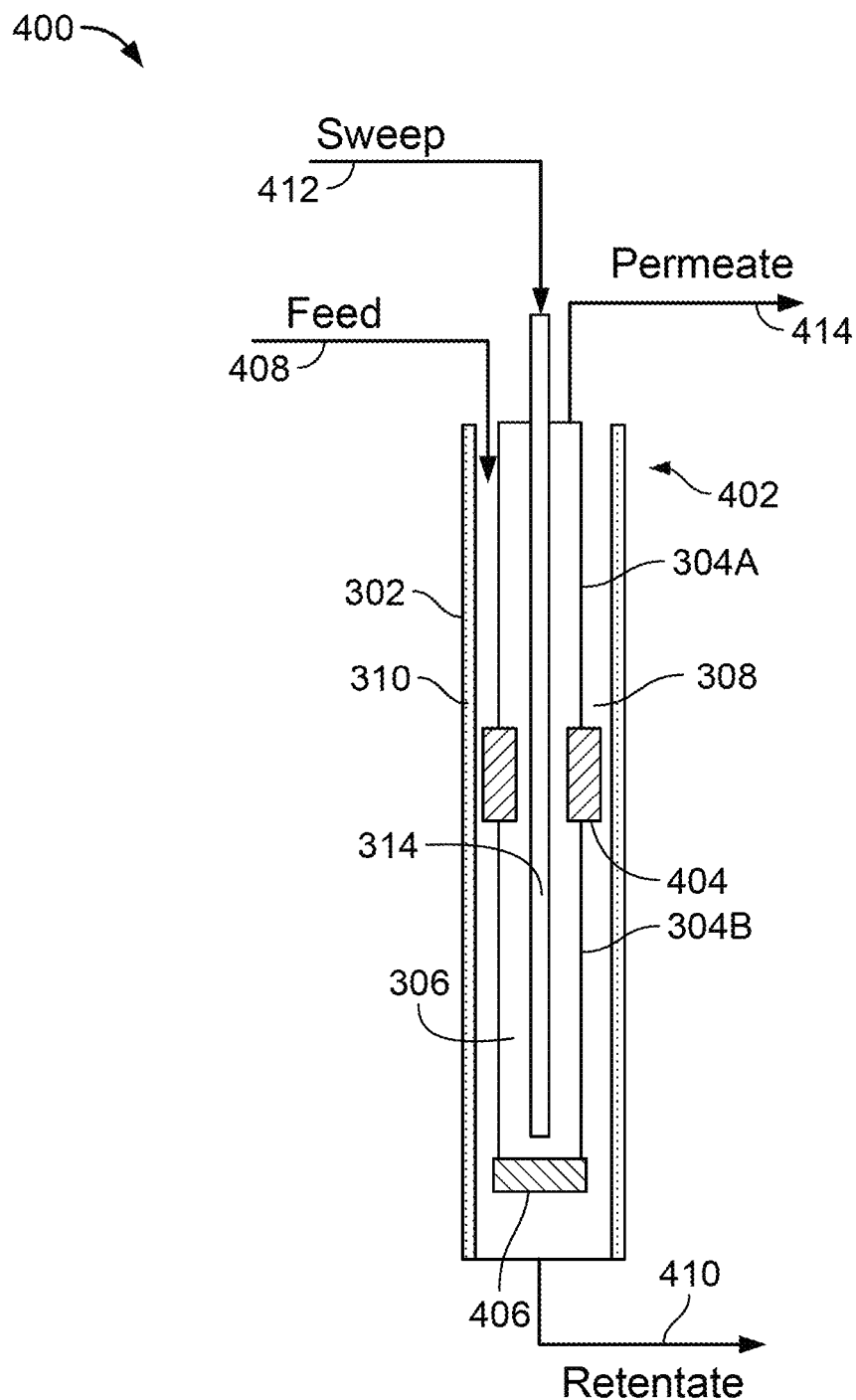
Figure 7:
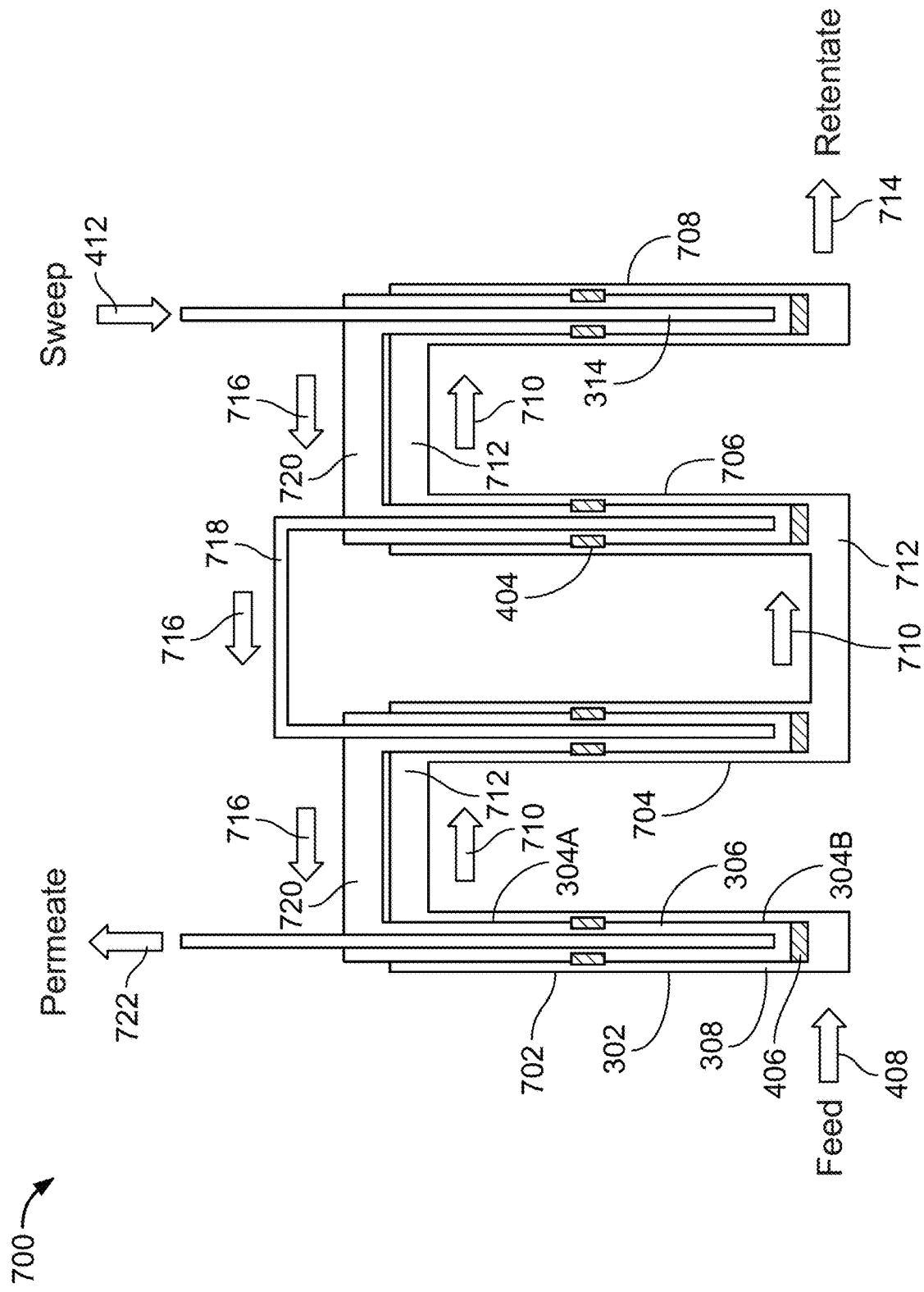

An insertion tube 314 (inner tube) is disposed in the bore 306 of the tubular membrane 304. The insertion tube 314 (e.g., stainless-steel tubing) has an inner volume space 316 for routing of sweep gas. The routing may facilitate that the sweep gas displaces hydrogen permeate in the bore 306 in a direction countercurrent to flow in the region 308 (retentate side) external to the tubular membrane 304. See, for example, discussion below of the routing of sweep gas via an insertion tube as indicated in FIGS. 4 and 7.

The outer diameter of the feed tube 302 may be, for example, the range of 15 millimeters (mm) to 50 mm. The wall thickness of the feed tube 302 may be, for example, in the range of 1 mm to 3 mm. The outer diameter of the tubular membrane 304 may be, for example, in the range of 8 mm to 30 mm. The wall thickness of the tubular membrane 304 may be, for example, in the range of 1 mm to 3.5 mm. The outer diameter of the insertion tube 314 may be, for example, in the range of 4 mm to 15 mm. The wall thickness of the insertion tube 314 may be, for example, in the range of 0.3 mm to 1.5 mm. These numeral values for dimensions of reactor 300 components are exemplary and not meant to limit the present techniques.

In one example for dimensions of outer diameter×wall thickness: the feed tube 302 is 26.9 mm×1.6 mm, the tubular membrane 304 is 14.0 mm×2.0 mm, and the insertion tube 314 is 7.0 mm×0.5 mm. Thus, in this example, the thickness (perpendicular distance) of the annulus volume (region 308) between the inside surface of the feed tube 302 wall and the outside surface of the tubular membrane 304 is 11.3 mm. The thickness (perpendicular distance) of the annulus volume in the bore 306 between the inside surface of the tubular membrane 304 wall and the outside surface of the insertion tube 314 is 5.0 mm.

Lastly, the membrane reactor 300 may be a unit in a module of multiple membrane reactors 300. The module may be in an overall membrane reformer reactor having multiple modules of multiple membrane reactors 300, as discussed below. The multiple modules may be coupled operationally. The insertion tube 314 may facilitate fluidic coupling of membrane reactors 300 in a module (and between modules) with respect to the sweep-gas countercurrent flow arrangement in the overall membrane reformer.

FIG. 4 is a membrane reactor 400 that may be in a module in a membrane reformer having multiple modules of membrane reactors 400. In the illustrated example, the top portion 402 of the membrane reactor 400 may be coupled to other membrane reactors 400 in a module. A module typically has more than one membrane reactor 400. The module may include piping (tubing) and associated connectors for coupling membrane reactors 400 in a module. The membrane reformer can have multiple modules that are operationally connected. The depicted membrane reactor 400 can be characterized as a unit (reactor unit) in a module having multiple such units. Again, the overall membrane reformer may have multiple modules. The membrane reactor 400 (and the overall membrane reformer) may have the operating conditions discussed above with respect to the preceding figures.

The membrane reactor 400 includes a feed tube 302 that may be the outer tube of the reactor 400. The feed tube 302 may be stainless steel or other alloys, such as an iron-chromium-aluminum alloy. In operation, the feed tube 302 can act as a heater tube in that electrical heating may be applied on the outside surface of the feed tube 302. In some implementations, electrically-heated plates (heat distribution plates) are employed to heat the feed tube 302 by conduction from the electrically heated plates in contact with the outer surface of the feed tube 302. In certain implementations, the feed tube 302 wall itself may be an electrical-resistive heating element in receiving electricity for electrical resistance heating. If so, the feed tube 302 may be a material (e.g., nickel-chromium alloy) giving adequate resistance to electricity for electrical thermal heating.

The reactor 400 includes two hydrogen-selective tubular membranes 304A and 304B each having a respective bore 306. The combination of the two tubular membranes 304A and 304B can be considered a single tubular membrane with the two tubular membranes 304A, 304B each longitudinal portion of the single tubular membrane.

The two tubular membranes 304A, 304B are coupled to each other via a connector block 404. The reactor 400 includes an insertion tube 314 (as discussed above for sweep gas) disposed in the bore 306. The insertion tube 314 as situated is continuation through an inner diameter of the connector block 404.

The two tubular membranes 304A and 304B may be connected to provide for tubular membrane length in the reactor 400. In one embodiment, the connector block 404 is a metallic connector (e.g., metallic cap) with two graphite seals for the two membranes, respectively. Further, the reactor 400 includes closed connector 406 (end block) at the bottom portion of the lower tubular membrane 304. The closed connector 406 may be, for example, an end cap (metallic cap) with a seal that is a graphite sealing material.

Two or more hydrogen-selective tubular membranes may be connected to give the desired membrane length in the reactor 400. In other examples, a single hydrogen-selective tubular membrane without a connector block 404 may be employed to give the desired membrane length in the reactor 400.

As discussed, the tubular membranes 304A, 304B can each include hydrogen-selective membrane material (e.g., Pd or a Pd alloy) applied on the outside surface of a respective porous ceramic tube. The nonporous membrane-material layer (e.g., palladium or palladium alloy membrane layer) is generally the selective layer that allows primarily only hydrogen to pass through the tubular membrane into the respective bores 306 of the tubular membranes 304A, 304B. As mentioned, this membrane-material layer may have a thickness, for example, in the range of 3 microns to 20 microns.

The membrane reactor 400 includes a region 308 external to the tubular membranes 304A, 304B as a reaction space for the reforming reaction (and WGS reaction). A catalyst 310 is disposed in the region 308, such as at the inside surface of feed tube 302 wall. In certain examples, the catalyst 310 is applied on the inside surface of the feed tube 302 wall via washcoating. If so, the feed tube 302 may be a material (e.g., iron-chromium-aluminum alloy) conducive to receiving the washcoated layer of catalyst 310. For embodiments in which a washcoated catalyst is employed as the catalyst 310, the washcoated catalyst 310 may have a thickness (layer thickness) in the range, for example, of 100 microns ($\mu m$) to 400 $\mu m$. The thickness may at least 50 $\mu m$ or at least 250 $\mu m$. The thickness may be less than 500 $\mu m$ or less than 250 $\mu m$. The catalyst 210 disposed on the feed tube 302 inside surface may be a washcoat of low-temperature reforming catalyst (e.g., for steam reforming). The catalyst 210 can additionally include WGS catalyst.

In operation, feed 408 is introduced into the region 308 for the reforming reaction (and WGS reaction) to generate hydrogen and carbon dioxide in the region 308 external to the tubular membranes 304A, 304B. As discussed, the heat for the endothermic reforming reaction may be provided by electrical heating. The feed 408 can include hydrocarbon and steam. The hydrocarbon may include, for example, natural gas, methane, LPG, a mixture of C1-C5 hydrocarbons, and so forth. The feed 408 can be retentate from another membrane reactor 400 depending on the sequencing of membrane reactors 400 in the given module of the overall membrane reformer.

As indicated, the product gas generated in the region 310 includes hydrogen and carbon dioxide. The hydrogen diffuses through the tubular membranes 304A, 304B into the bore 316 of the connected tubular membranes 304, 304B. The carbon dioxide discharges as retentate 410 from the region 308. The technique generally can include diffusing the hydrogen through the tubular membranes is contemporaneous with converting the hydrocarbon to hydrogen.

A sweep gas 412 (e.g., steam or nitrogen) is fed to the insertion tube 314. The sweep gas 412 flows downward through the insertion tube 314 (see volume space 316 in FIG. 3) and discharges from the bottom end portion of the insertion tube 314. The sweep gas 412 then flows upward through the bore 306 (outside of the insertion tube 314) displacing hydrogen in a direction countercurrent to the feed 408 reactant flow through the region 308. Thus, the insertion tube 314 routes sweep gas 412 to facilitate the flow of sweep gas 412 (and displaced hydrogen) in the bore 316 adjacent the membrane wall in a direction counter current to the feed 408 and retentate 410. This countercurrent flow in displacing hydrogen from the bore 306 may promote diffusion of hydrogen from the region 310 though the tubular membranes 304A, 304B into the bore 306. The displaced hydrogen product may discharge as permeate 414 from the bore 306. The permeate 414 may include the sweep gas 412 that displaced the hydrogen.

In the illustrated embodiment, the feed tube 302 and the membrane 304B stop at the bottom portion of the reactor 400. The retentate 410 may discharge from the region 308 of the feed tube 102. The retentate 410 tubing may couple to another membrane reactor 400 in the module. The insertion tube 314 and permeate 414 tubing may be operationally coupled with another membrane reactor 400 in the module. FIG. 4 depicts a flow arrangement of feed 408 and sweep gas 412, and of the retentate 410 and permeate 414 out of the membrane reactor 400 reformer module. Overall countercurrent flow between permeate 414 and feed 408 is achieved through arrangements of sweep gas stream utilizing the insertion tube 314.

Figure 5:
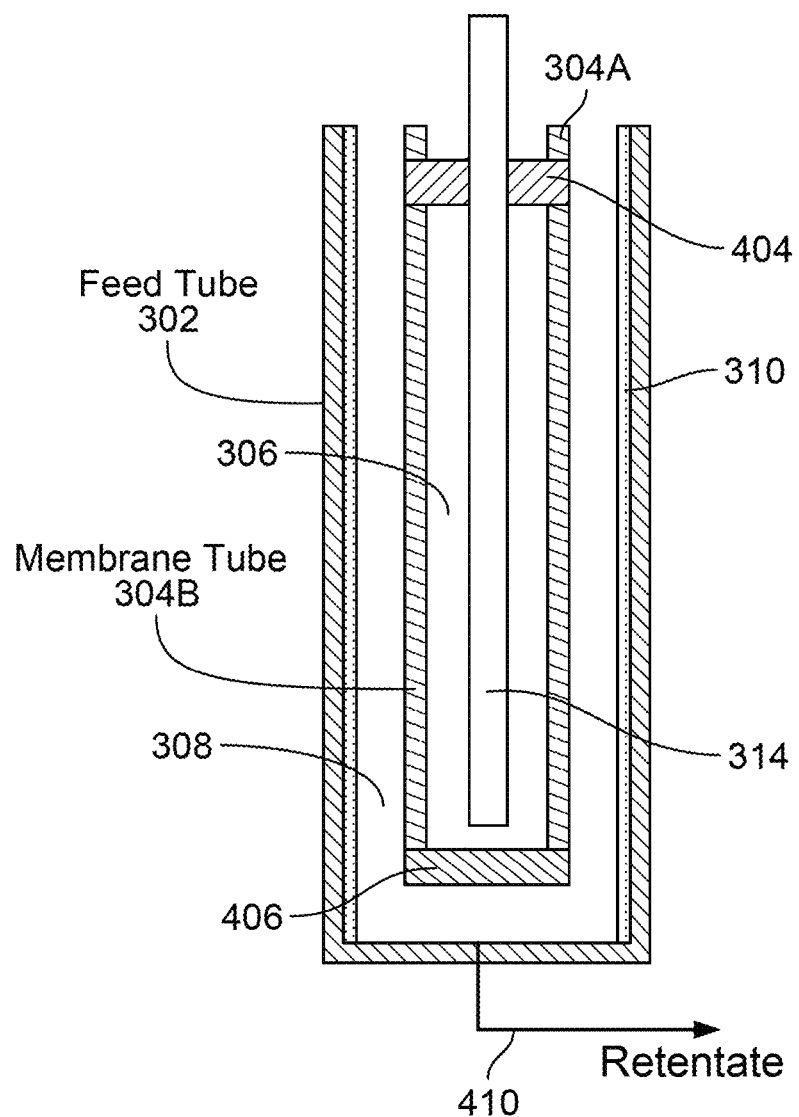

FIG. 5 is a bottom portion 500 of the membrane reactor 400 of FIG. 4. The feed tube 302 wall is depicted as a cross section. The tubular membrane 304B is depicted showing the tubular membrane 304B all and the bore 306.

Figure 6:
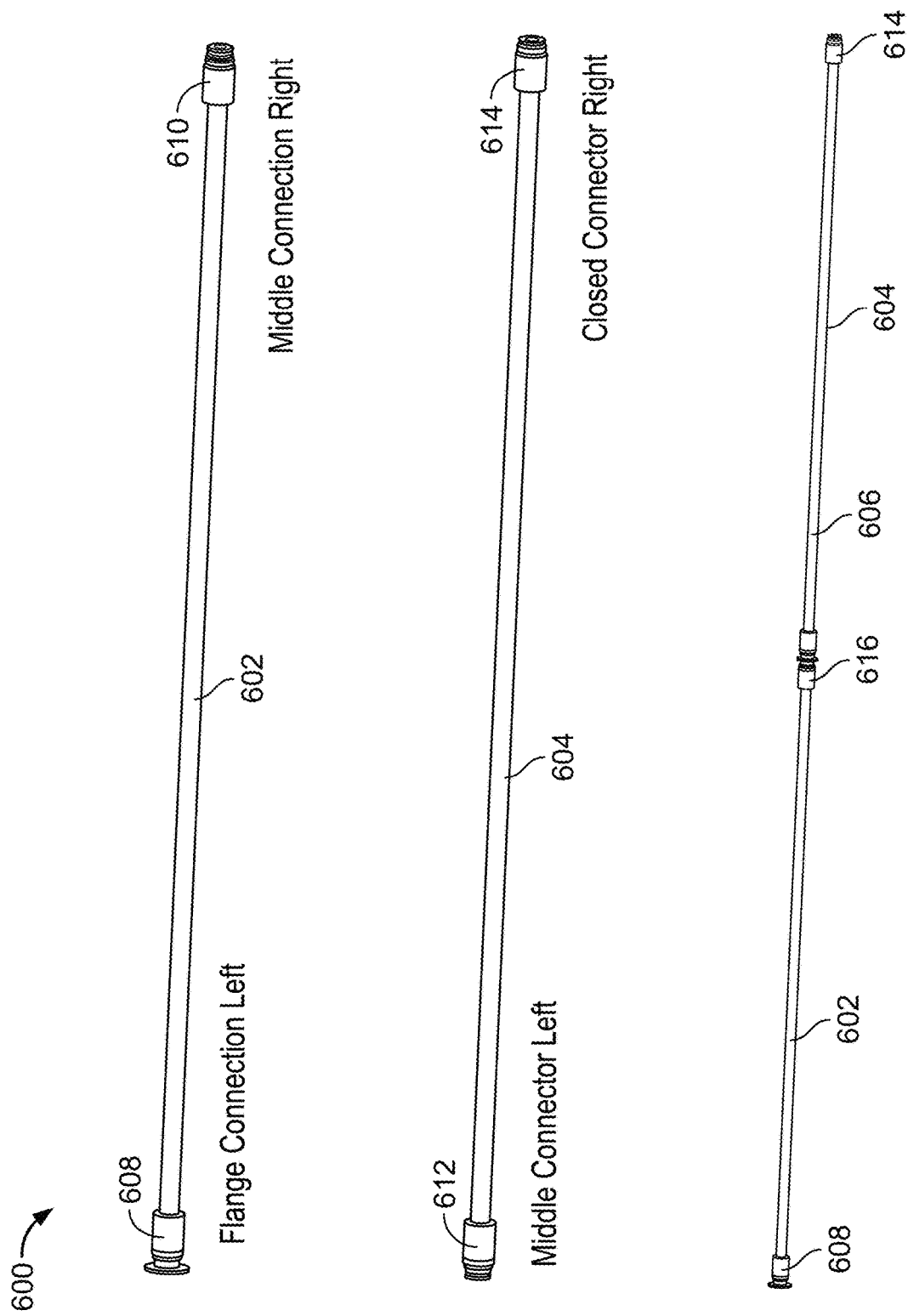
FIG. 6 is a diagram of tubular membranes.

FIG. 6 is a depiction 600 showing a first tubular membrane 602, a second tubular membrane 604, and a tubular membrane 606 that is a combination of the first tubular membrane 602 and the second tubular membrane 604 as longitudinally connected. The first tubular membrane 602 may be analogous to the tubular membrane 304A of FIG. 4. The second tubular membrane 604 may be analogous to the tubular membrane 304B of FIG. 4. The first tubular membrane 602 and the second tubular membrane 604 are hydrogen selective. Thus, the tubular membrane 606 is hydrogen selective. The tubular membrane 606 may be deployed in membrane reforming reactors and associated modules, as discussed.

In the illustrated example, the first tubular membrane 602 has a flange connector left 608 (e.g., with graphite seal) and a middle connector right 610. The flange connector 608 may have a graphite seal and utilized to connect to a conduit (tubing, piping, etc.) in a module having multiple membrane reactors of a membrane reformer. The flange connector 608 may be a tubing compression fitting instead of flanged. The second tubular membrane 604 has a middle connector left 612 and a closed connector right 614 (e.g., an end cap with graphite seal). The closed connector right 614 may be analogous to the end connector 406 discussed above with respect to FIG. 4. The tubular membrane 606 includes a middle connector 616 that is a mating of the middle connector right 610 and the middle connector left 612. The middle connector 616 may analogous to the connector block 404 of FIG. 4. The close connector right 614 may instead be a connector component to mate in a connector block with a connector component of a third tubular membrane (not shown).

Thus, illustrated in FIG. 6 is the connection of membrane tubes with end caps and connection blocks. Two or more membranes can be connected with each other to achieve overall length desired for the membrane module length. The connecting blocks and end caps can use different types of sealing materials. One example is a metallic cap with graphite sealing.

FIG. 7 is a module 700 of a membrane reformer. The membrane reformer may have multiple similar modules. In the illustrated embodiment, the module 700 (membrane module) has four membrane reactors 702, 704, 706, 708 as units of the module 700. Thus, the membrane reactors 702, 704, 706, 708 (e.g., as each a membrane reactor unit or module unit) may be labeled as module units. The feed and sweep gas are both in series across the reactors 702, 704, 706, 708. As discussed below, the module 700 includes eight tubular membranes. The total effective surface area of the tubular membranes in one example is 0.2885 square meter ($m^2$).

The four membrane reactors 702, 704, 706, 708 can each be analogous to the membrane reactor 300 or 400 discussed above. For instance, the reactors 702, 704, 706, 708 include catalyst for the steam reforming and WGS reactions. In the illustrated example, each membrane reactor 702, 704, 706, 708 has two tubular membranes (hydrogen-selective) that are longitudinally coupled via a respective connector block 404 (e.g., middle connector 616 of FIG. 6). Thus, the module 700 has 8 tubular membranes. The membrane surface area of the module 700 (with the 8 tubular membranes) may be, for example, in a range of 0.2 $m^2$ to 1.5 $m^2$. In one example, the 8 tubular membranes give an overall membrane surface-area of 0.2885 $m^2$ for the module 700. As discussed below, the membrane module 700 includes interconnects between the reactors 702, 704, 706, 708. As also discussed below, the flow arrangement gives countercurrent flow for sweep-gas displacement of hydrogen with respect to feed flow.

In operation, feed 408 is introduced into the region 308 of the first membrane reactor 702 in the feed tube 302 external to the two tubular membranes 304A, 304B. As discussed, the region 308 is between the feed tube 302 wall and the two tubular membranes 304A, 304B. The feed 408 can include hydrocarbon and steam. The hydrocarbon may include, for example, natural gas, methane, LPG, a mixture of C1-C5 hydrocarbon, and so forth. The feed 408 can be retentate from another membrane reactor 400 depending on the sequencing of the module 700 in the overall membrane reformer. Catalyst (not shown) disposed in the region 308 promotes the reaction(s). As discussed above, heat for the endothermic reforming reaction may be provided by electrical heating.

The steam-reforming reaction (and WGS reaction) occurs in the region 308 to generate hydrogen and carbon dioxide. The hydrocarbon (e.g., CH4 and heavier hydrocarbon) of the feed 408 is converted into hydrogen and carbon dioxide via the steam reforming (and the WGS reaction). The generated hydrogen diffuses from the region 308 through the tubular membranes 304A, 304B into the bore 306 of the tubular membranes 304A, 304B. The product gas remaining in the region 308 in the first reactor 702 includes primarily carbon dioxide and may be labeled as retentate. Also present in the region 308 may be unreacted feed 408 including unreacted hydrocarbon and unreacted steam.

The unreacted feed and carbon dioxide may flow 710 to the region 308 of the subsequent reactors 704, 706, 708 through interconnects 712 between the reactors. The unreacted feed may be converted to hydrogen and carbon dioxide. In the subsequent reactors 704, 706, 708, the produced hydrogen may diffuse from the region 308 through the tubular membranes to the bore 306 in the respective reactor. The flow 710 may discharge as retentate 714 from the feed tube 302 of the fourth reactor 708. The retentate 714 may be primarily carbon dioxide in some examples. Steam in the retentate 714 may be condensed and removed as liquid water from the carbon dioxide. The interconnects 712 for the flow 710 through the module 700 may each include a conduit and/or conduit fittings (e.g. tubing or piping fittings) such as a 180-degree bend or elbow. The conduit fittings may include compression fittings or flanged connectors to facilitate coupling of the interconnects 712 with the feed tubes 302.

The interconnects 712 conduits may include catalyst (e.g., packed catalyst) including reforming catalyst and WGS catalyst to further promote the reactions to convert hydrocarbon in flow 710 to hydrogen and carbon dioxide. The catalyst packed in interconnects 712 conduits can be in structured form or coated on the inside surface of the conduit or conduit elbow, or a packed-bed catalyst allowing to also use this space to create further mixing of the reactants.

In the illustrated embodiment, to displace hydrogen from the bore 306 of the tubular membranes in the reactors 702, 704, 706, 708, a sweep gas 412 is introduced into the insertion tube 314 of the fourth reactor 708. The sweep gas 412 discharges from the bottom portion of the insertion tube 314 in the fourth reactor 708. The sweep gas 412 then flows upward through the tubular membranes bore 306 of the fourth reactor 708 in a direction countercurrent to the flow 710. The sweep gas 412 displaces hydrogen from the bore 306.

The sweep gas 412 (with displaced hydrogen) flows 716 from the fourth reactor 708 to the upstream reactors 702, 704, 706 via an insertion tube interconnect 718 (e.g., interconnect conduit and/or conduit fitting, etc.) and membrane tube interconnects 720 (e.g., interconnect conduit or conduit fittings, etc.). This flow 716 discharges from the fourth reactor 708 via a membrane interconnect 720 to the third reactor 706. In the third reactor 706, the flow 716 (sweep gas and displaced hydrogen) flows downward through the bore 306 displacing hydrogen in a direction countercurrent to the feed/retentate flow 710. The flow 716 then enters the bottom portion of the insertion tube 314 in the third reactor 706 and flows through an insertion tube interconnect 718 to the second reactor 704. In the second reactor 704, the flow 716 discharges from the bottom portion of the insertion tube 314 and flows upward through the bore 306 displacing hydrogen in a direction countercurrent to the feed/retentate flow 710. This flow 716 of sweep gas and product hydrogen discharges from the second reactor 704 through a membrane tube interconnect 720 to the first reactor 702. In the first reactor 702, the flow 716 is downward through the bore 306 displacing hydrogen in a direction countercurrent to the feed 408 flow. The flow 716 (product hydrogen and sweep gas) enters the bottom portion of the insertion tube 314 to discharge from the first reactor 702.

The discharge may be labeled as permeate 722 (primarily hydrogen) with sweep gas. The permeate 722 with sweep gas may be sent as sweep gas to another module 700 in the membrane reformer. On the other hand, the permeate 722 with sweep gas may be processed to remove the sweep gas from the permeate 722, and hydrogen collected or distributed as product hydrogen. For implementations with steam as the sweep gas, the steam may be condensed (e.g., in a heat exchanger or heat-exchanger vessel) to remove the steam as liquid water from the hydrogen.

The insertion tube interconnect 718 and the membrane tube interconnects 720 may include conduit fittings (e.g., tubing or piping fittings), such as a 180-degree bend or elbow, compression fittings, flanged connectors, and so on. In examples, the membrane tube interconnects 720 may couple to the tubular membranes via a flanged connector, such as the flange connector left 612 discussed with respect to FIG. 6.

The module 700 may have a pre-reforming catalyst in an inlet portion of the module 700. One or more reactors 702, 704, 706, 708 may have a pre-reforming catalyst in an inlet portion inside the feed tube 302. In an embodiment, the first reactor 702 that receives the feed 408 has a pre-reforming catalyst in an inlet portion of the feed tube 302. The pre-reforming catalyst may promote conversion of higher hydrocarbons in the feed 408 to methane.

The module 700 may have a dry reforming catalyst in an outlet portion of the module 700. One or more reactors 702, 704, 706, 708 may have a dry reforming catalyst in an outlet portion inside the feed tube 302. In an embodiment, the last reactor 708 that discharges the retentate 714 has a dry reforming catalyst in an outlet portion of the feed tube 302. The dry reforming catalyst may promote conversion of hydrocarbons to H2 and provide resistance to coking.

Figure 8:
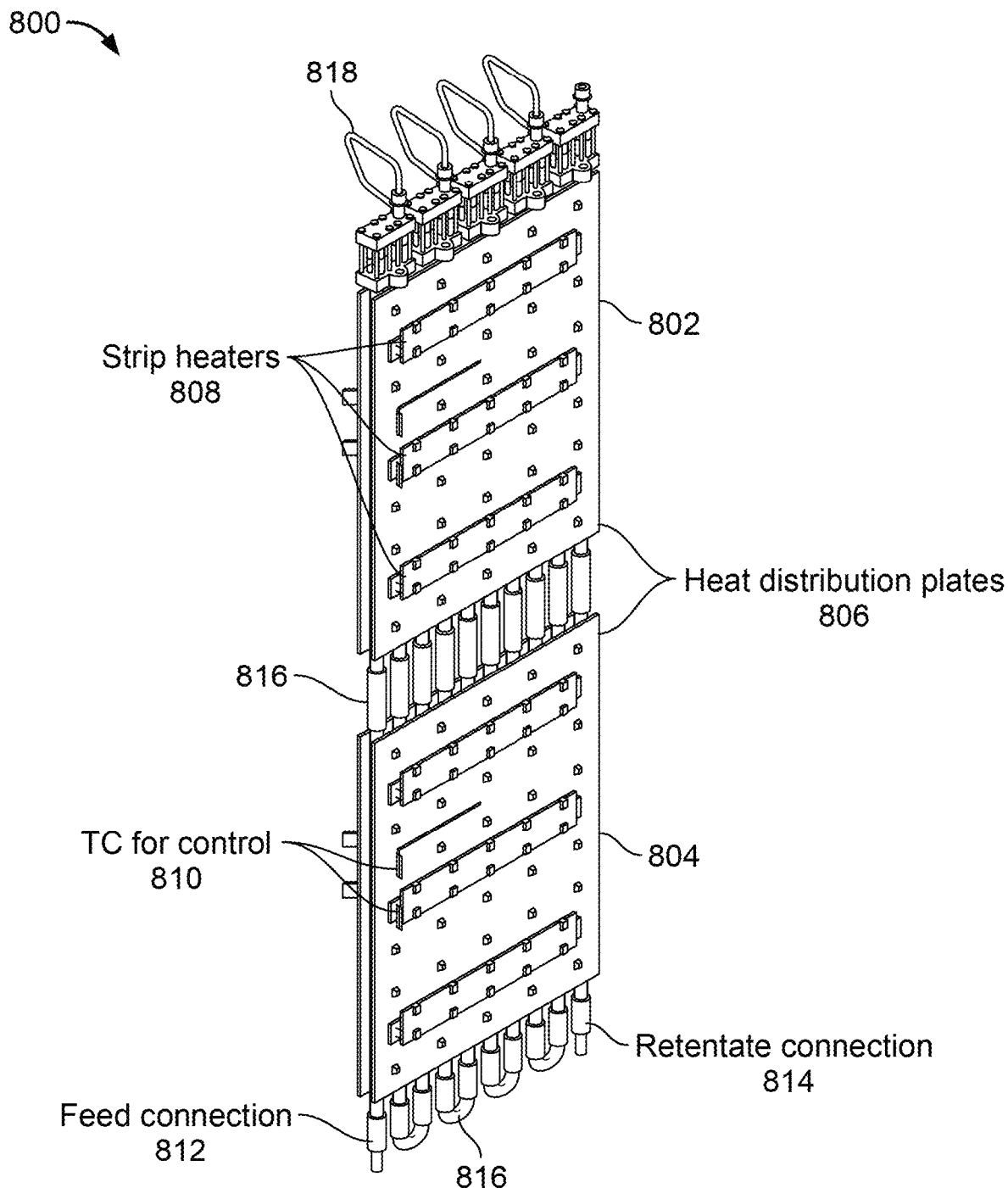

FIG. 8 is a membrane reformer 800 having first module 802 of five membrane reactors and a second module 804 of five membrane reactors. Thus, the membrane reformer 800 (or this portion of the membrane reformer 800) has ten membrane reactors which also may be labeled as membrane units. In this illustrated implementation, the ten membrane reactors operate in series. The ten membrane reactors may each be analogous to the membrane reactors discussed with respect to the preceding figures.

In this example, the tubular membrane in each membrane reactor is two tubular membranes (hydrogen-selective) longitudinally coupled via a connector block. Therefore, the membrane reformer 800 has 20 tubular membranes. In one implementation, the total effective surface area cumulatively of the 20 tubular membranes is 0.7213 $m^2$. The cumulative membrane surface area of the membrane reformer 800 may generally increase as membrane reactors and tubular membranes are added to the membrane reformer 800.

The five membrane reactors in each module 802, 804 are mounted behind (and in contact with) a respective heat-distribution plate 806. The heat distribution plates 806 are metal plates that conduct heat generated by the strip heaters 808 to the membrane reactors. The strip heaters 808 are mounted on the heat distribution plates 806. In one example, the sheath temperature of the strip heaters 808 in operation is at least 760° C. Strip heaters may include a heating element (an electrically resistive metal), a protective sleeve or sheath, and mounting hardware. The metallurgy of strip heaters may typically be steel. The strip heater may include an electrical terminal (e.g., with lead wires) that extends from the sheath for electrical source connections. The electrical source (not shown) may be a battery or renewable energy, and so forth. Strip heaters can generally be bolted or clamped to a solid surface. Some strip heaters may include mounting holes to mount the strip heater to a surface.

The membrane reformer 800 includes temperature controllers 810 for the strip heaters 806. The temperature controller 810 (e.g., a mechanical thermostat or bimetal thermostat) may be associated with a control system that directs the operating temperature of the membrane reformer 800. In this example, the temperature controllers 810 are disposed on the heat distribution plates 806. The membrane reformer 800 may have external thermal insulation for thermal efficiency and for personnel protection.

The membrane reformer 800 has a feed inlet 812 for hydrocarbon and steam, and a retentate outlet 814 to discharge carbon dioxide. The membrane reformer 800 also has a permeate hydrogen outlet (not shown) that may be disposed at the top portion of the membrane reformer 800. The permeate hydrogen discharged may include sweep gas. Interconnect conduits 816 (e.g., tubing, piping, fittings, elbows, etc.) operationally couple the two modules 802 and 804 and their membrane reactors with respect to permeate and retentate. The interconnect conduits 818 at the top portion of the membrane reformer 800 are for sweep gas.

The interconnect conduits 816 at the bottom portion of the membrane reformer 800 as 180-degree (U-shaped) elbows or bends may include additional catalyst (e.g., steam-reforming catalyst and WGS catalyst) to convert hydrocarbon to hydrogen and carbon dioxide. The catalyst can be coated on the inside surface of the elbows or in structured form, or a packed bed catalyst. This catalyst is in addition to the catalyst disposed in the region external to the tubular membranes in the membrane reactors.

In summary, FIG. 8 illustrates details on the module design with connection of 10 membrane units with total 20 membranes connected to provide larger membrane surface area. Also shown are permeate and retentate interconnections. Heat distribution arrangements are also shown. A heat distribution plate is utilized along with strip heaters to provide the energy for the reforming reaction. Moreover, while the heat distribution plate can provide physical (mechanical) support for a module, a support structure (not shown) may provide for mounting of the module conduits (tubes). The support may be, for example, at the top portion of the module. In certain implementations, the conduits may be generally maintained in a hanging position to facilitate thermal expansion of the conduits while avoiding significant mechanical stress in the conduits.

Figure 9:
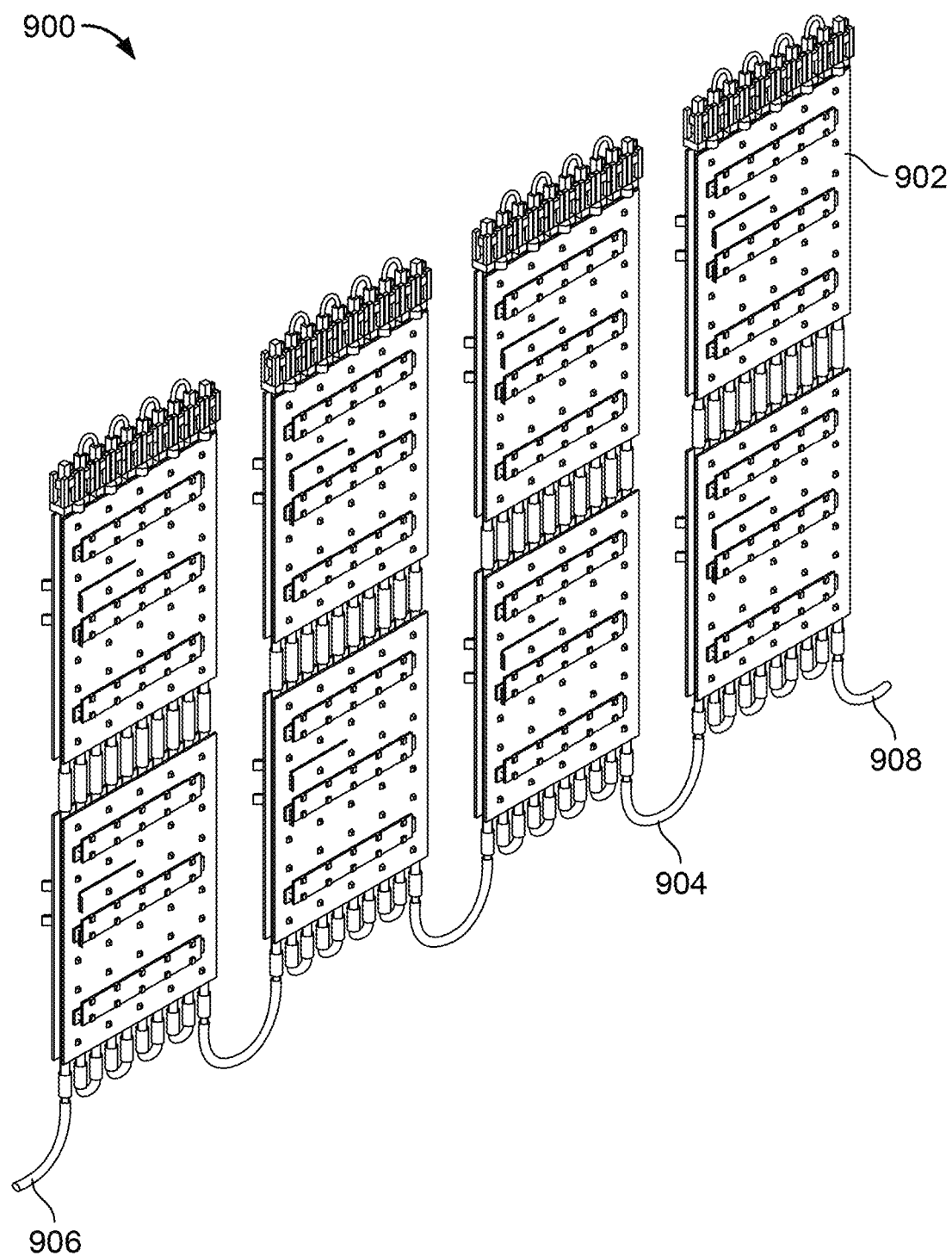

FIG. 9 is a membrane reformer 900 having eight modules 902 that may be analogous to the modules 802, 804 of FIG. 8. Indeed, the eight modules 902 each have five membrane reactors (membrane units). The five membrane reactors in each module 902 operate in series. In examples, multiple modules 902 may be coupled in series (and/or parallel) to increase throughput (hydrogen production) of the membrane reformer 900. In this example, the eight modules 902 operate in series. The membrane reformer 900 includes interconnections 904 between the modules 902 as depicted. The feed inlet 906 may receive hydrocarbon and steam. The retentate outlet 908 may discharge primarily carbon dioxide. The membrane 900 also includes a permeate hydrogen discharge. See, for example, the permeate hydrogen (and sweep gas) discharge 1018 in FIG. 10.

FIGS. 10, 11, 12, and 13 show details on the flow distribution in the manifold form the top and bottom sides. The "U" shaped interconnects as shown in FIG. 9 can also be used to pack additional catalyst between the two modules as required by the reaction or design of the membrane reformer design. The catalyst packed in this region could in structured form or coated on the tube form or could purely be a packed bed catalyst allowing to also use this space to create further mixing of the reactants.

Figure 10:
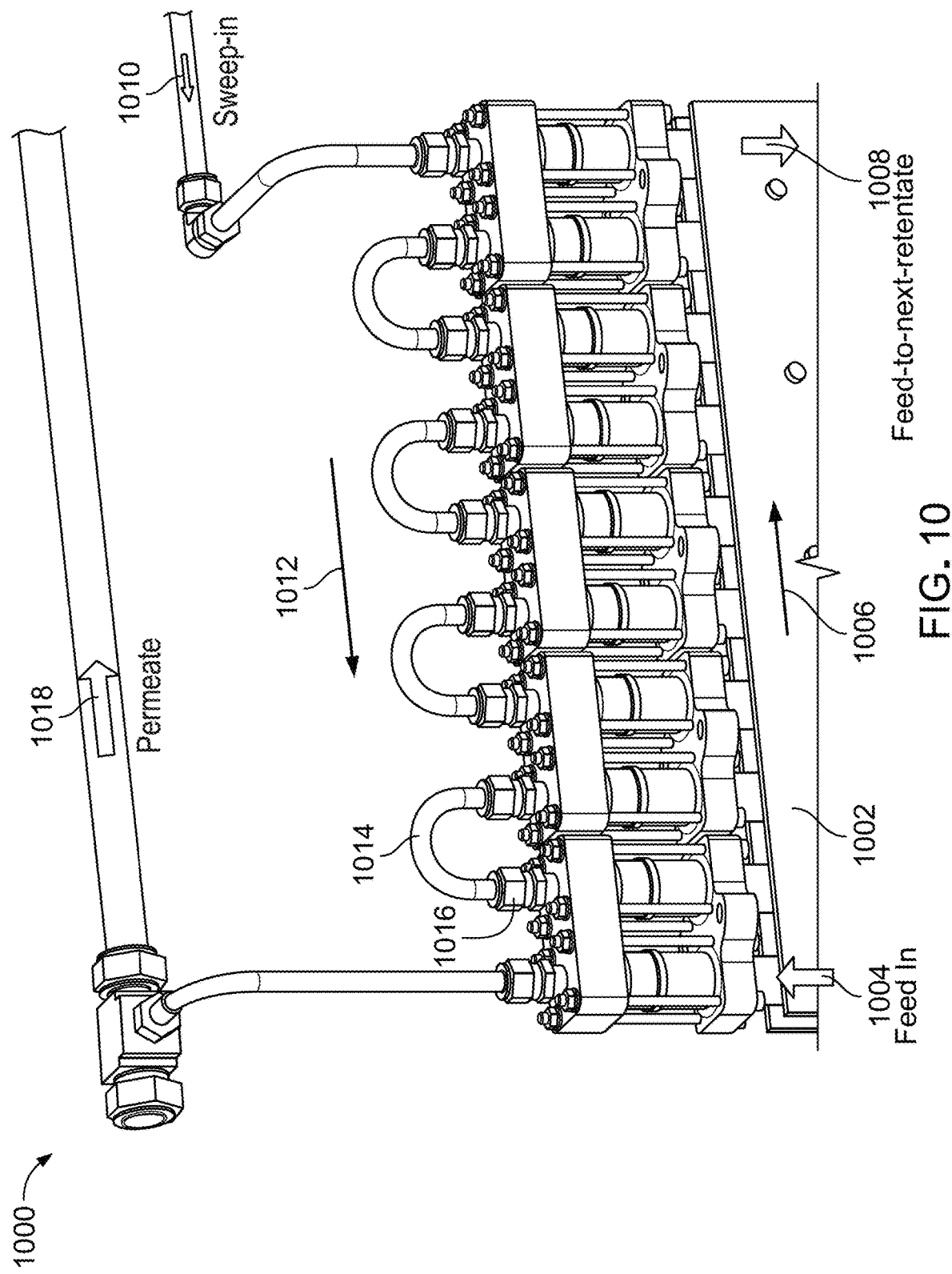

FIG. 10 is a top portion 1000 (including a manifold) of a module (e.g., an upper module 902 of FIG. 9) of a membrane reformer. The membrane reactors (module units) are disposed behind and in contact with the heat distribution plate 1002.

The feed 1004 (hydrocarbon and steam) flows in series through the membrane reactors generally in the direction indicated by arrow 1006. The feed 1004 flows through the region (retentate side) external to the tubular membranes in the membrane reactors. The discharge 1008 from this region of the last membrane reactor in series may be as retentate (primarily carbon dioxide) or for feed to the next module in the membrane reformer.

Sweep gas 1010 is introduced to the bore of the tubular membrane(s) in the last membrane reactor in the series. An insertion tube may be employed, as discussed. The sweep gas 1010 generally flows in the direction indicated by arrow 1012. The sweep gas 1010 flows between the membrane reactors (module units) via interconnect conduits 1014. The interconnect conduits 1014 may be a U elbow with conduit fittings 1016 (e.g., tubing fittings) that couple the interconnect conduits 1014 to the tubular membranes in the respective membrane reactor in the series. As explained above, the sweep gas 1010 displaces hydrogen from the bores of the tubular membranes. Permeate 1018 discharges from the membrane bore of the first membrane reactor.

FIG. 11 is a top portion 1100 of a membrane-reformer module of multiple membrane reactors. In this illustration, the upper portion of three of the multiple membrane reactors are depicted as coupled to a manifold 1102. Flow configurations highlighted with reference numerals include sweep-gas in 1104, sweep-gas pass 1106, sweep-gas flow down 1108, return sweep-gas up 1110, feed flow up 1112, feed pass 1114, and feed flow down 1116.

Each of the three membrane reactors includes a feed tube 1118 (feed conduit or outer conduit), a tubular membrane 1120, a bore 1122 of the tubular membrane 1120, and a region 1124 in the feed tube 1118 external to the tubular membrane 1120 in which catalyst is disposed and the reforming/WGS reactions occur. The three membrane reactors each include an insertion tube 1126 disposed in the bore 1122 and that goes into the manifold 1102.

In this example, a flanged connector 1128 couples the tubular membrane to the sweep-gas interconnects. The flange connector 1128 may be analogous to the flange connector left 608 of FIG. 6. The flange connector 1128 includes the flanged portion, an outer portion 1130, and graphite material 1132. The flange portion and the outer portion 1130 apply compression to the graphite material 1132 to give a graphite seal via the graphite material 1132.

Figure 12:
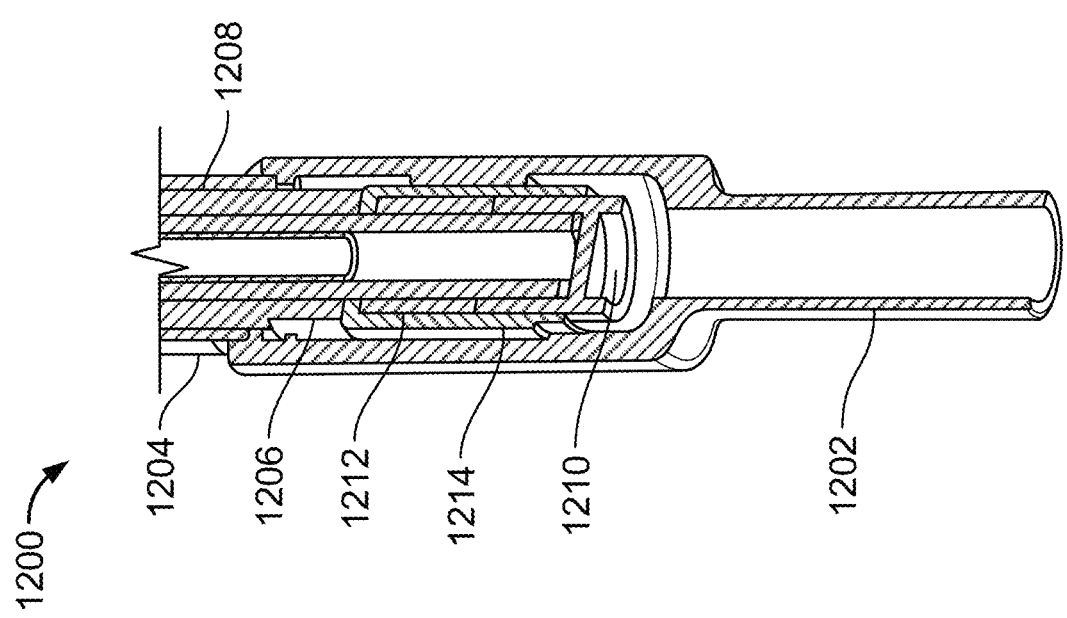
FIG. 12 is a diagram of a feed interface of a membrane reformer.

FIG. 12 is a feed interface 1200 on a bottom portion of a membrane-reformer module. The feed interface 1200 may be for feed flow in from the conduit 1202 or feed flow out to the conduit 1202. Depicted are (1) the feed conduit 1204, (2) the tubular membrane 1206 disposed in the feed conduit, and (3) the region volume 1208 between the feed conduit 1024 wall and the tubular membrane 1206. The feed interface 1200 includes an end cap 1210 having the end cap portion compressing the graphite 1212 to give a graphite compression seal. The end cap 1210 includes an outer potion 1214. The end cap 1210 may be analogous to the close connector right 614 of FIG. 6.

Figure 13:
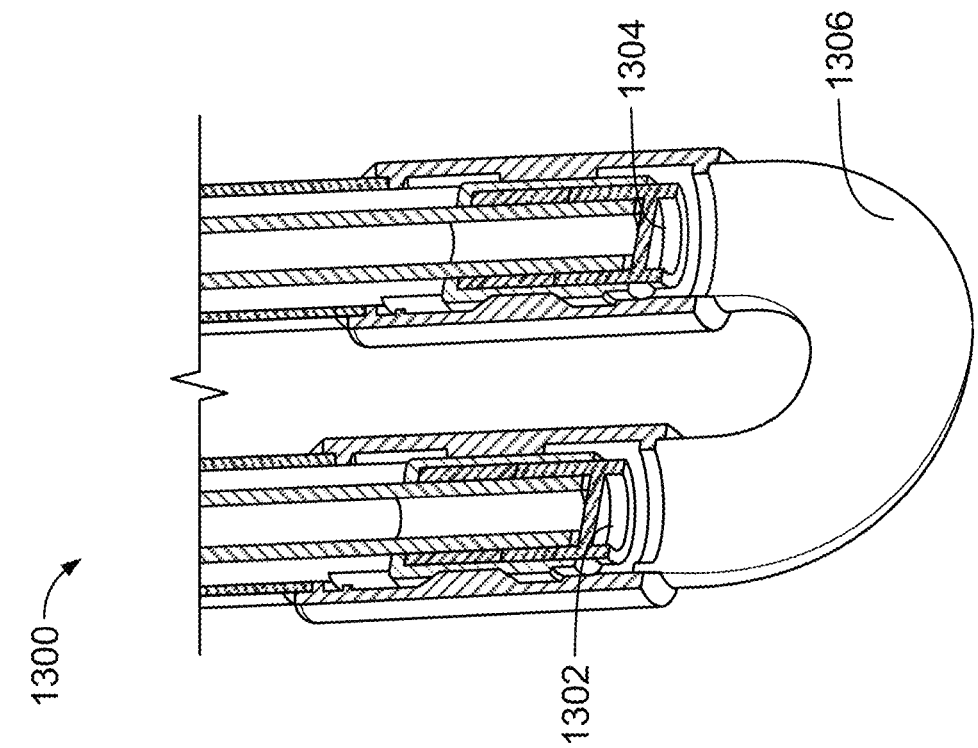
FIG. 13 is a diagram of an interconnect interface in a membrane reformer.

FIG. 13 is interconnect interface 1300 of a membrane-reform module for flow of feed/retentate between membrane reactors (module units). The interconnect interface 1300 includes two end caps 1302, 1304 configured similar to the end cap 1210 of FIG. 12. The interconnect interface 1300 includes an interconnect conduit 1306 that is a 180-degree bend. In certain embodiments, the interconnect conduit 1306 may be utilized to pack additional catalyst between the two membrane reactors or between two modules of membrane reactors. Such may depend on the membrane reformer design and operating conditions. This additional catalyst (if employed) may be catalyst packed in this interconnect conduit 1306 including in structured form or as coated on the inside surface of the interconnect conduit 1306, or as a packed bed catalyst allowing to also utilize this region space to generate further mixing of the reactants.

Figure 14:
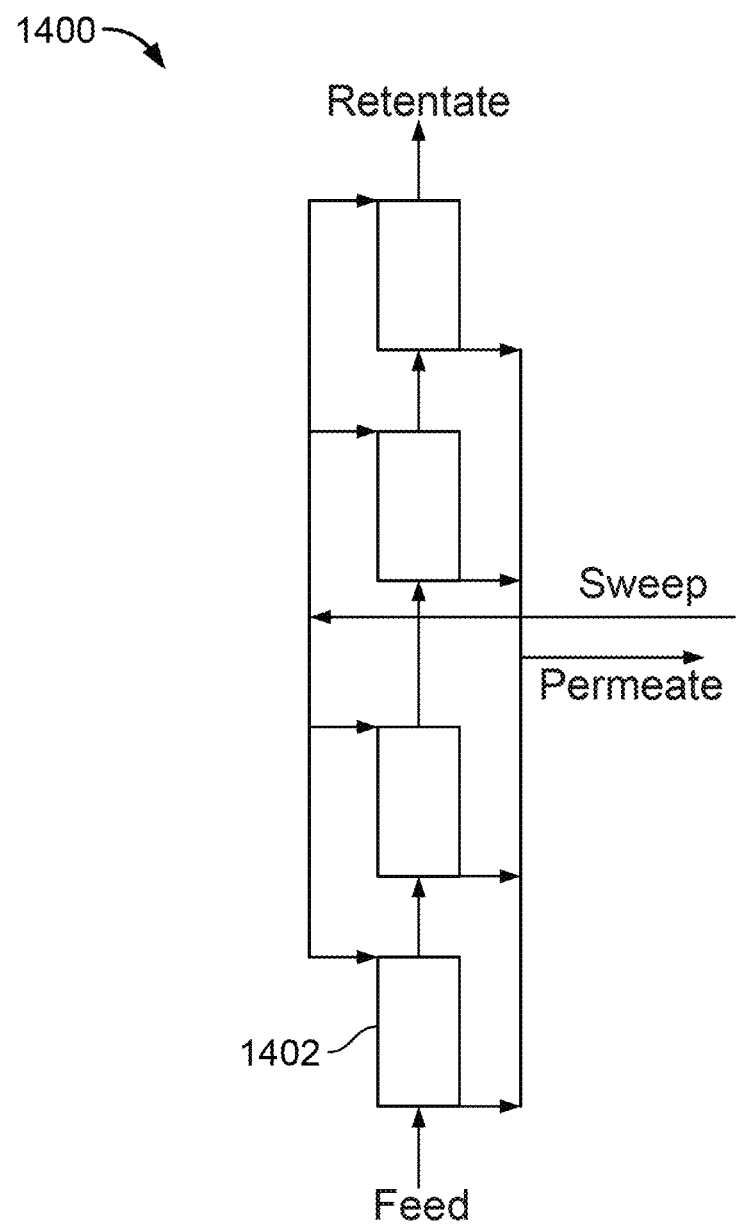
FIGS. 14-17B are diagrams of membrane reformers.
Like reference numbers and designations in the various drawings indicate like elements.

FIG. 14 is a membrane reformer 1400 having four modules 1402 each having multiple membrane reactors (module units). The modules 1402 are arranged in series with respect to feed. The modules 1402 are arranged in parallel with respect to sweep gas flow. The distribution of the sweep gas in parallel may reduce pressure drop on the permeate side of the membrane reformer 1400.

Figure 15:
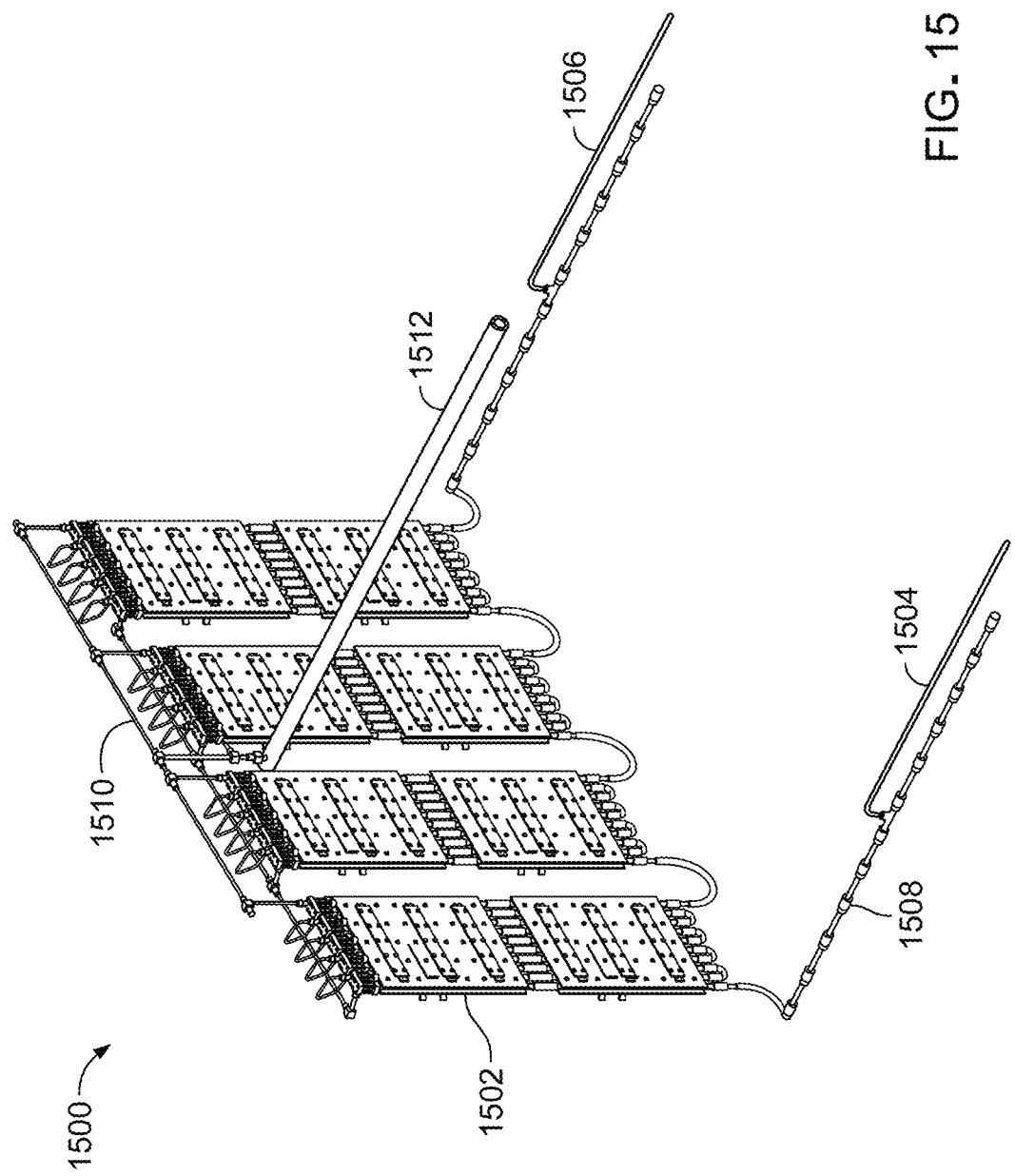

FIG. 15 is a membrane reformer 1500 having eight modules 1502 each having multiple membrane reactors (module units). The membrane reformer 1500 is configured to receive additional modules of multiple membrane reactors, including as multiple lines of multiple modules. The membrane reformer 1500 includes a feed header 1504 and retentate discharge header 1506. Both the feed header 1504 and retentate discharge header 1506 have connection points 1508 (e.g., T-fittings) for receiving additional modules. The membrane reformer 1500 includes a sweep-gas supply header 1510 and a permeate discharge header 1512. In this example, the membrane reformer 1500 may include at least 40 membrane reactors (module units) and 80 tubular membranes giving an overall effective surface area of tubular membranes equal to 2.885 $m^2$.

Figure 16:
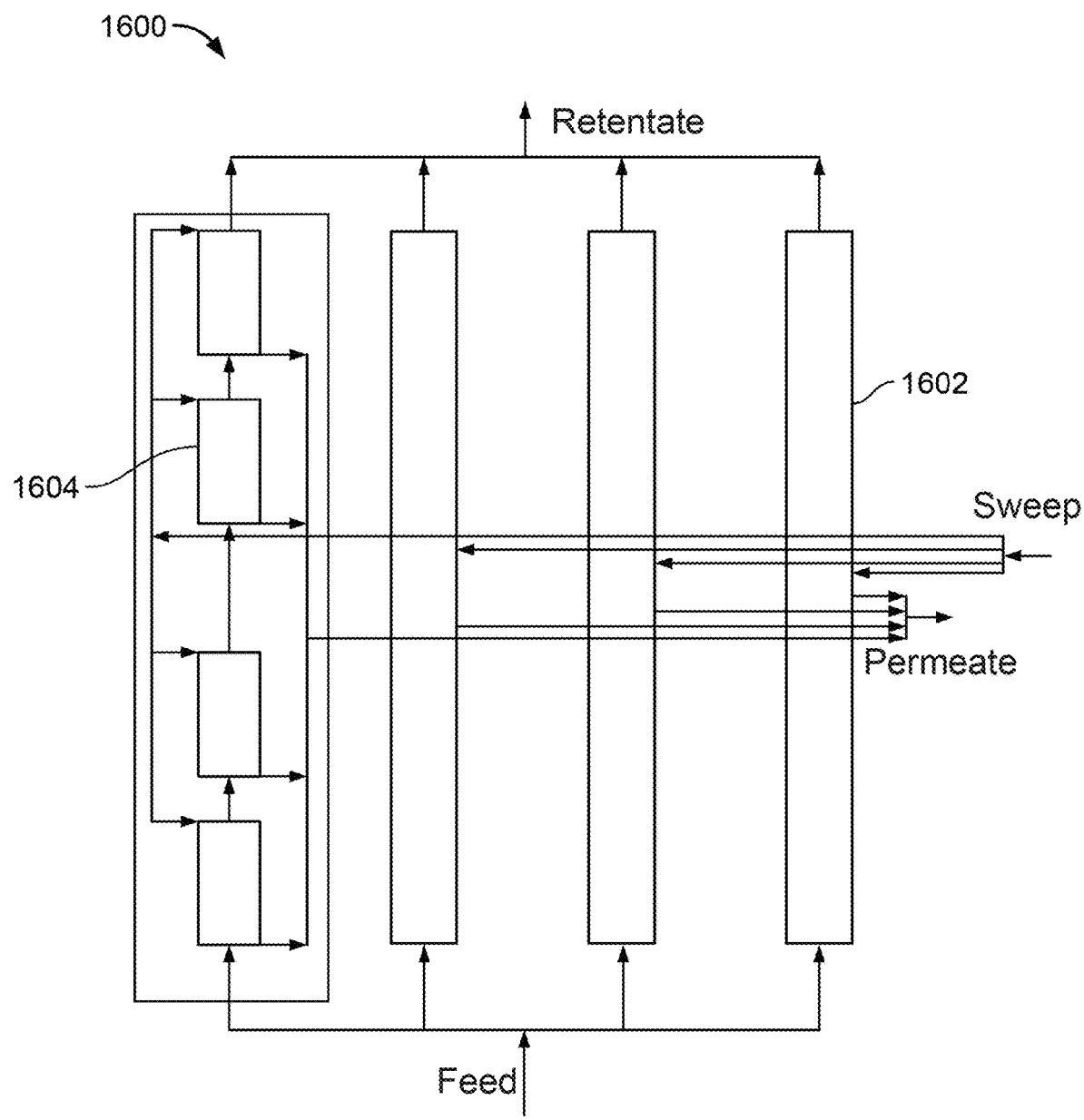

FIG. 16 is a membrane reformer 1600 having four lines 1602 each having four modules 1604 of multiple membrane reactors (module units). In each line 1602, the modules 1604 are connected in series on the feed side and parallel on the sweep-gas side. The feed flow is distributed in parallel to each line 1602 in order to reduce retentate pressure drop. Sweep gas flow is distributed in parallel to each line 1602. Each module 1604 has a countercurrent flow of sweep gas with respect to feed flow across the tubular membranes. FIG. 16 demonstrates the modular coupling of membrane modules in achieving greater production capacity of hydrogen up to, for example, 10,000 $Nm^3$/hr. Also depicted are the flow connections for sweep, permeate, feed, and retentate streams.

The membrane reactors and membrane reformers described herein may have an operating temperature less than 650° C., e.g., with heat provided by an electrical heater. The hydrogen production capacity of the membrane reformer may be less than 10,000 $Nm^3$/hr of hydrogen, less than 5,000 $Nm^3$/hr of hydrogen, or less than 1,000 $Nm^3$/hr of hydrogen. The hydrogen product discharged from the membrane reformer may be at least 90 mole percent (mol %) hydrogen or at least 99.9 mol % hydrogen, on a basis free of sweep gas. If the sweep gas is steam, the hydrogen product may be on a dry basis at least 90 mol % hydrogen or at least 99.9 mol % hydrogen. The retentate discharged from the membrane reformer may be at least 90.0 mol % carbon dioxide on a dry basis.

Figure 17A:
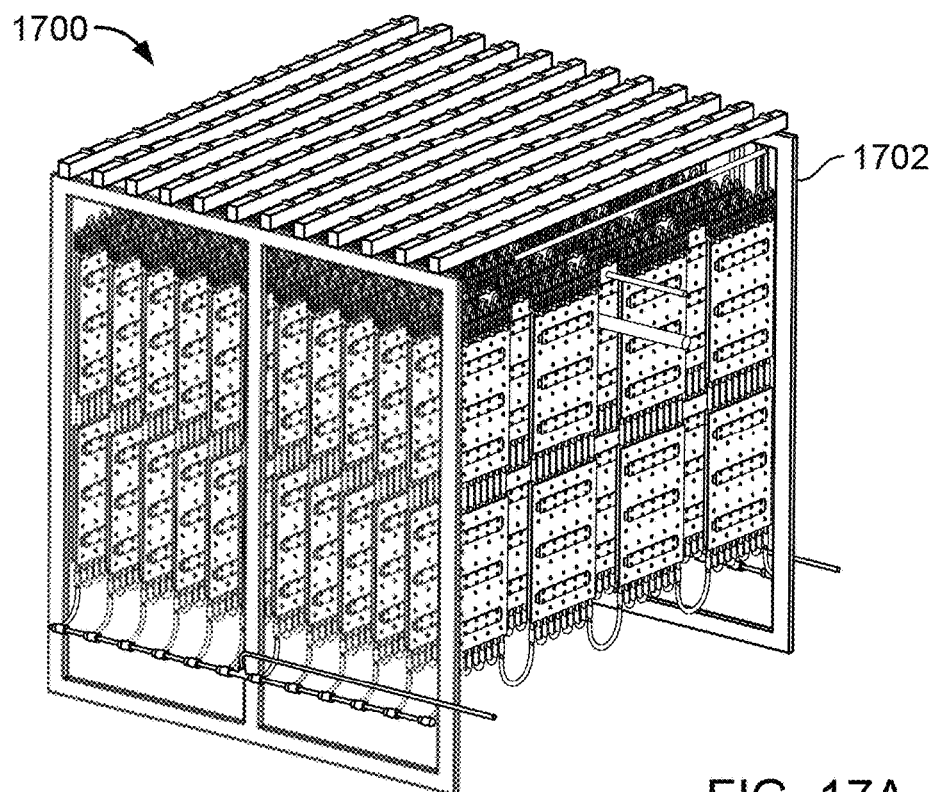
Figure 17B:
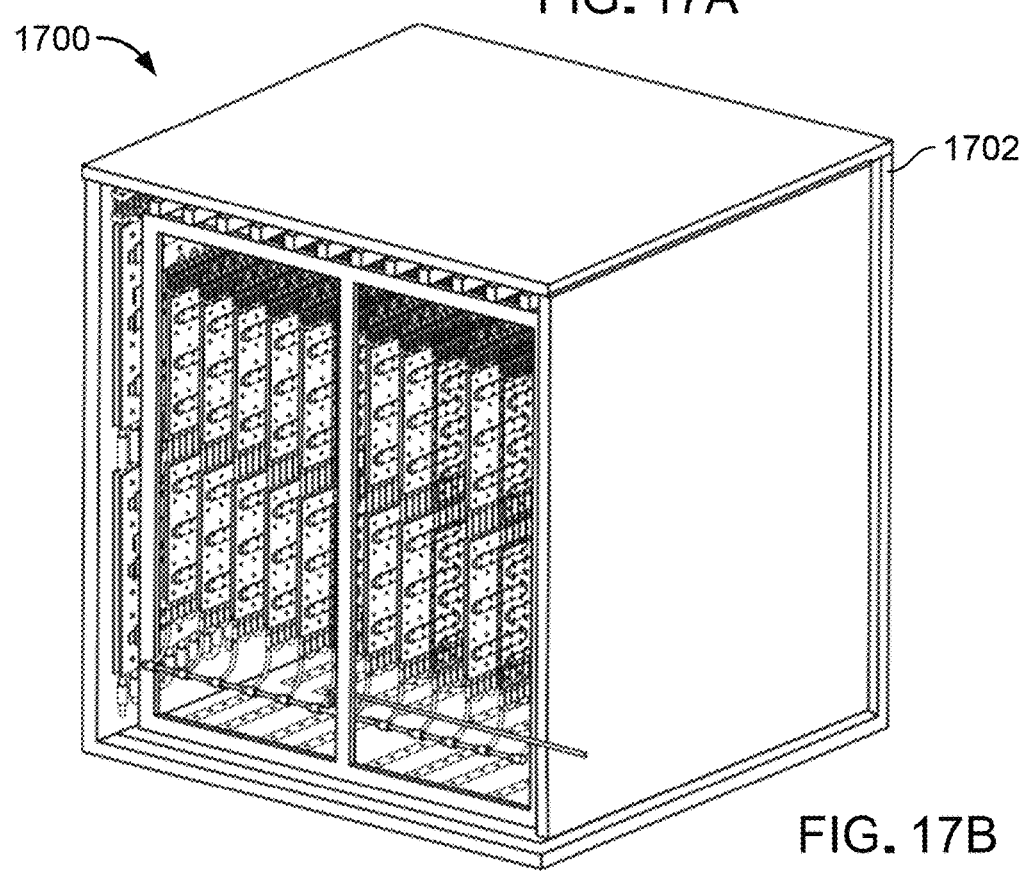

FIGS. 17A and 17B are a membrane reformer 1700 employing a multi-module design analogous to the reformer 1600 of FIG. 16. The membrane reformer 1700 is in a box 1702. The box 1702 may be characterized as a housing. FIG. 17A is the reformer 1702 in the box 1702 without siding. FIG. 17B is the reformer 1700 in the box 1702 with siding. In examples, the box 1702 is an electrically heated box. The box 1702 may be a rectangular box and have dimensions of width less than 5 m, length less than 5 m, and height less than 5 m.

In one example, 12 lines (4 modules each) are disposed in the box 1702. Each module has 10 membrane reactors (module units). The tubular membrane in each membrane reactor is two tubular membranes coupled longitudinally. Therefore, the membrane reformer 1700 in this example includes 480 membrane reactors (module units) and 960 tubular membranes in the box 1702 which has dimensions of 3 m×3 m×3 m. The total effective surface area of the 960 tubular membranes is 34.62 $m^2$. The membrane reformer 1700 may operate, for example, with a sweep-gas pressure of 5 bar. In this example, the membrane reformer 1700 has a hydrogen production capacity of 100 $Nm^3$/hr.

The invention allows to integrated hydrogen production though steam reforming, water-gas shift reaction and hydrogen separation/purification steps in one single reactor. It also allows to in-situ separate H2 and CO2 produced using hydrocarbon feeds. This process intensification can give an efficient and simple hydrogen production process resulting in reduced hydrogen production cost by significant reduction in capital and operating cost. This intensification also allows to run the process at much lower operating temperatures and higher pressures than conventional reforming process used for hydrogen production.

The conventional SMR process is inefficient when scaled down. The present techniques may be more efficient and give a smaller footprint for hydrogen production. Hydrogen produced in large centralized SMR plants is inexpensive but transporting and storing hydrogen is inefficient (and expensive) due to hydrogen low density and the specialized trucks (tube trailers) and tanks (high-pressure carbon fiber-reinforced vessels) that are required. The present techniques facilitate hydrogen to be produced efficiently where the hydrogen is needed (including mobility applications) utilizing hydrocarbons that can be efficient (and inexpensive) to transport in certain embodiments. Moreover, the retentate may be primarily carbon dioxide at relatively high pressure and capture-ready, for example, for sequestration, enhanced oil recovery (EOR), or re-use as a feedstock, and so on.

An embodiment is a membrane reformer having multiple membrane reactors to produce hydrogen. The hydrogen production capacity of the membrane reformer may be less than 10,000 $Nm^3$/hr of hydrogen, or less than 1,000 $Nm^3$/hr of hydrogen. The membrane reactors of the membrane reformer may be disposed operationally in parallel or series, or both. In some examples, the membrane reformer includes at least 30 membrane reactors. In one example, the at least 30 membrane reactors are disposed in a box having a width less than 5 m, a length less than 5 m, and a height less than 5 m. The membrane reformer may include less than 30 membrane reactors. The membrane reformer may include an electrical heater (e.g., electrical strip heater) to provide heat to the multiple membrane reactors to give an operating temperature of the membrane reformer less than 650° C. The membrane reformer may include a heat distribution plate in contact with the multiple membrane reactors, and wherein the electrical heater is disposed on the heat distribution plate.

Each membrane reactor includes: (1) a feed conduit as an outer conduit of the membrane reactor to receive the hydrocarbon and steam into a region external to a tubular membrane in the feed conduit; and (2) catalyst (including steam-reforming catalyst) disposed in the region in the feed conduit external to the tubular membrane to convert the hydrocarbon into hydrogen and carbon dioxide; and (3) the tubular membrane in the feed conduit to diffuse the hydrogen from the region through the tubular membrane to a bore of the tubular membrane. The region is a retentate side of the tubular membrane and discharges retentate including carbon dioxide. The bore is a permeate side of the tubular membrane and discharges permeate including hydrogen. Each membrane reactor has an insertion tube disposed in the bore to facilitate flow of sweep gas through the bore in a direction countercurrent to flow of hydrocarbon and steam in the region external to the tubular membrane. The hydrocarbon received at the feed conduits may include, for example, methane, liquid petroleum gas (LPG), or a mixture of C1 to C5 hydrocarbons, or any combinations thereof.

In implementations, the outer diameter of the feed conduit can be, for example, in a range of 15 mm to 50 mm. The wall thickness of the feed conduit can be, for example, in a range of 1 mm to 3 mm. The outer diameter of the tubular membrane may be, for example, in a range of 8 mm to 30 mm. The wall thickness of the tubular membrane may be, for example, in a range of 1 mm to 3.5 mm. The outer diameter of the insertion tube may be, for example in a range of 4 mm to 15 mm. The wall thickness of the insertion tube may be, for example, in a range of 0.3 mm to 1.5 mm. The tubular membrane in each membrane reactor may be two tubular membranes coupled longitudinally in some examples. In certain implementations, the catalyst is not in contact with the tubular membrane. The catalyst may further include WGS catalyst.

The multiple membrane reactors include at least a first membrane reactor and a second membrane reactor. In implementations, the membrane reformer may have an interconnect conduit that couples the feed conduit of the first membrane reactor to the feed conduit of the second membrane reactor, wherein the feed conduit of the second membrane reactor receives the retentate from the first membrane reactor via the interconnect conduit. The retentate discharged from the first membrane reactor to the feed conduit of second membrane reactor may include steam and hydrocarbon unreacted in the first membrane reactor.

Another embodiment is a method of producing hydrogen, e.g., at less than 5,000 Nm3/hr. The method includes providing hydrocarbon and steam to a membrane reformer having multiple membrane reactors. The method includes converting the hydrocarbon to hydrogen and carbon dioxide via catalyst (including steam-reforming catalyst) disposed external to tubular membranes in the multiple membrane reactors. The catalyst includes steam-reforming catalyst and may further include WGS catalyst. In implementations, the catalyst is not in contact with the tubular membranes. The method includes diffusing hydrogen through the tubular membranes in the multiple membrane reactors to respective bores of the tubular membranes. Diffusing the hydrogen through the tubular membranes may be contemporaneous with converting the hydrocarbon to hydrogen. The method includes flowing a sweep gas through the respective bores to displace hydrogen in a direction countercurrent to flow of hydrocarbon and steam external to the tubular membranes. In implementations, the displacing of hydrogen in the respective bores with the sweep gas increases permeation of hydrogen external to the tubular membranes through the tubular membranes. The method includes discharging hydrogen as permeate with the sweep gas from the respective bores, and discharging carbon dioxide external to the tubular membranes as retentate (e.g., also including unreacted steam) from the multiple membrane reactors.

The method may include electrically heating the multiple membrane reactors, wherein an operating temperature of the multiple membrane reactors is less than 650° C. The electrically heating of the multiple membrane reactors may involve electrically heating the multiple membrane reactors via a heat distribution plate in contact with the multiple membrane reactors. In implementations, an operating pressure external to the tubular membranes in the multiple membrane reactors is in a range of 10 bar to 50 bar. The operating pressure of the respective bores may be in a range of 1 bar to 5 bar.

The method may include flowing retentate from a first membrane reactor of the multiple membrane reactors to a second membrane reactor of the multiple membrane reactors, wherein the retentate from the first membrane reactor comprises steam and hydrocarbon unreacted in the first membrane reactor. The method may include discharging hydrogen as permeate with the sweep gas from at least one bore of the respective bores as product hydrogen from the membrane reformer, wherein the product hydrogen is at least 90 mole percent hydrogen on a basis free of sweep gas. For the sweep gas as steam, and the method may include condensing the sweep gas in the product hydrogen to remove the sweep gas as liquid water from the product hydrogen.

Yet another embodiment is a method of hydrogen generation. The method includes producing hydrogen with a membrane reformer having multiple membrane reactors. Each membrane reactor has an outer tube and a tubular membrane (e.g., two tubular membranes coupled longitudinally) in the outer tube. The producing of the hydrogen for each membrane reactor includes: (1) converting hydrocarbon into hydrogen and carbon dioxide in a region in the outer tube external to the tubular membrane in presence of steam via catalyst (including reforming catalyst and can include WGS catalyst) disposed in the region; (2) diffusing hydrogen from the region through the tubular membrane into a bore of the tubular membrane, wherein the region is a retentate side of the tubular membrane, and wherein the bore is a permeate side of the tubular membrane; (3) discharging carbon dioxide (e.g., with unreacted steam) from the region; (4) flowing a sweep gas through the bore to displace hydrogen from the bore in a direction countercurrent to flow of the hydrocarbon in the region external to the tubular membrane; and (5) discharging hydrogen and sweep gas from the bore. The method may include facilitating flow of the sweep gas in the countercurrent direction via an insertion tube disposed in the bore. The operating temperature of the membrane reactor may be less than 650° C. The operating pressure external to the tubular membrane in the outer tube may be in a range of 10 bar to 50 bar. The operating pressure of the bore may be in a range of 1 bar to 5 bar. As discussed, dimensions may include: an outer diameter of the outer tube in a range of 15 mm to 50 mm; wall thickness of the outer tube is in a range of 1 mm to 3 mm; outer diameter of the tubular membrane is in a range of 8 mm to 30 mm; and wall thickness of the tubular membrane in a range of 1 mm to 3.5 mm.

The method may include flowing carbon dioxide discharged from the region of a first membrane reactor of the multiple membrane reactors to the region of a second membrane reactor of the multiple membrane reactors, wherein the carbon dioxide from the region of the first membrane reactor comprises unreacted steam and unreacted hydrocarbon. The method may include discharging hydrogen from the membrane reformer as product hydrogen, wherein the product hydrogen comprises at least 90 mole percent hydrogen on a basis free of sweep gas. For examples of the sweep gas being steam, and the product hydrogen may be at least 90 mole percent on a dry basis.

Yet another embodiment is a method of hydrogen generation. The method includes producing hydrogen with a membrane reformer having multiple membrane reactors. Each membrane reactor has an outer conduit (outer tube, feed conduit, feed tube) and a tubular membrane (e.g., two tubular membranes coupled longitudinally) in the outer conduit. In this embodiment, the inlet section of the membrane reformer is packed with hydrocarbon pre-reforming catalyst (e.g., nickel-based, nickel-ruthenium, etc.). The pre-reforming catalyst may facilitate to convert higher hydrocarbon molecules in the feed into C1 (methane) type compounds, and this methane-rich synthesis gas is then passed on downstream in membrane reformer.

Yet another embodiment is a method of hydrogen generation. The method includes producing hydrogen with a membrane reformer having multiple membrane reactors. Each membrane reactor has an outer tube and a tubular membrane (e.g., two tubular membranes coupled longitudinally) in the outer tube. In this embodiment, a dry reforming catalyst (e.g., Ni—Mo on MgO, noble metal-based catalyst, etc.) is packed towards (near, adjacent, or at) the outlet of the membrane reactor. In implementations, the reactor mixture towards the outlet may have a high concentration of carbon species (e.g., CO2, CO, CH4) because a majority of the generated hydrogen has permeated. The mixture may also have unconverted steam (water). This environment rich in carbon species near or at the outlet may be processed via the dry reforming catalyst. A dry reforming catalyst may facilitate to convert remaining CH4 or hydrocarbon by reacting with CO2 into CO and H2. Dry reforming catalyst may contribute to reduce coke-formation tendency on the membrane surface, as well as advance conversion of remaining hydrocarbons into H2.

A number of implementations have been described. Nevertheless, it will be understood that various modifications may be made without departing from the spirit and scope of the disclosure.

What is claimed is:

1. A membrane reformer to produce hydrogen, comprising:
   multiple membrane reactors each having an outer conduit, respectively, wherein each membrane reactor comprises:
   a feed conduit as the outer conduit of the membrane reactor to receive hydrocarbon and steam into a region external to a tubular membrane in the feed conduit;
   catalyst disposed in the region in the feed conduit external to the tubular membrane to convert the hydrocarbon into hydrogen and carbon dioxide, the catalyst comprising steam-reforming catalyst, wherein the catalyst is not in contact with the tubular membrane;
   the tubular membrane in the feed conduit to diffuse the hydrogen from the region through the tubular membrane to a bore of the tubular membrane, wherein the region is a retentate side of the tubular membrane to discharge retentate comprising carbon dioxide, and wherein the bore is a permeate side of the tubular membrane to discharge permeate comprising hydrogen; and
   an insertion tube disposed in the bore to facilitate flow of sweep gas through the bore in a direction countercurrent to flow of hydrocarbon and steam in the region external to the tubular membrane;
   an interconnect conduit that couples the feed conduit of a first membrane reactor of the multiple membrane reactors to the feed conduit of a second membrane reactor of the multiple membrane reactors to convey retentate discharged from the first membrane reactor to the second membrane reactor; and
   a heat distribution plate that contacts an outer surface of the feed conduit of a third membrane reactor of the multiple membrane reactors and contacts an outer surface of the feed conduit of a fourth membrane reactor of the multiple membrane reactors.

2. The membrane reformer of claim 1, wherein the tubular membrane comprises two tubular membranes coupled longitudinally.

3. The membrane reformer of claim 1, wherein an outer diameter of the feed conduit is in a range of 15 millimeters (mm) to 50 mm, wherein a wall thickness of the feed conduit is in a range of 1 mm to 3 mm, wherein an outer diameter of the tubular membrane is in a range of 8 mm to 30 mm, wherein a wall thickness of the tubular membrane is in a range of 1 mm to 3.5 mm, wherein an outer diameter of the insertion tube is in a range of 4 mm to 15 mm, and wherein a wall thickness of the insertion tube is in a range of 0.3 mm to 1.5 mm.

4. The membrane reformer of claim 1, wherein the catalyst is coated on an inside surface of the feed conduit, wherein the catalyst comprises water-gas shift (WGS) catalyst, and wherein the feed conduit of a given membrane reactor of the multiple membrane reactors is not the feed conduit of other membrane reactors of the multiple membrane reactors.

5. The membrane reformer of claim 1, wherein the catalyst is washcoated on an inside surface of the feed conduit, wherein the multiple membrane reactors comprise the first membrane reactor and the second membrane reactor, and wherein the feed conduit of the second membrane reactor receives the retentate from the first membrane reactor via the interconnect conduit.

6. The membrane reformer of claim 1, wherein the retentate discharged from the first membrane reactor to the feed conduit of the second membrane reactor comprises steam and hydrocarbon unreacted in the first membrane reactor.

7. The membrane reformer of claim 1, wherein the hydrocarbon comprises methane, liquid petroleum gas (LPG), or a mixture of C1 to C5 hydrocarbons, or any combinations thereof, and wherein production capacity of the membrane reformer is less than 10,000 normal cubic meter per hour ($Nm^3$/hr) of hydrogen.

8. The membrane reformer of claim 1, wherein production capacity of the membrane reformer is less than 1,000 $Nm^3$/hr of hydrogen.

9. The membrane reformer of claim 1, comprising an electrical heater disposed on the heat distribution plate.

10. The membrane reformer of claim 9, wherein the electrical heater comprises a strip heater.

11. The membrane reformer of claim 9, wherein the electrical heater to provide heat via the heat distribution plate to at least some of the multiple membrane reactors, wherein an operating temperature of the membrane reformer is less than 650° C.

12. The membrane reformer of claim 1, wherein the multiple membrane reactors comprise membrane reactors disposed operationally in series.

13. The membrane reformer of claim 1, wherein the multiple membrane reactors comprise at least 30 membrane reactors.

14. The membrane reformer of claim 13, wherein the at least 30 membrane reactors comprises a first module of membrane reactors and a second module of membrane reactors, and wherein the at least 30 membrane reactors are disposed in a box comprising a width less than 5 meters (m), a length less than 5 m, and a height less than 5 m.

15. The membrane reformer of claim 1, wherein at least one of the multiple membrane reactors comprises a dry reforming catalyst in an outlet portion of the feed tube.

16. The membrane reformer of claim 15, wherein the dry reforming catalyst comprises a noble metal-based catalyst, or nickel-molybdenum (Ni—Mo) on magnesium oxide (MgO).

17. A method of producing hydrogen, comprising:
   providing hydrocarbon and steam to a membrane reformer comprising multiple membrane reactors each comprising a respective outer conduit having a tubular membrane disposed therein and a catalyst disposed therein external to the tubular membrane, wherein the catalyst is not in contact with the tubular membrane;

converting the hydrocarbon to hydrogen and carbon dioxide via the catalyst external to tubular membranes in the multiple membrane reactors, the catalyst comprising steam-reforming catalyst;

diffusing hydrogen through the tubular membranes in the multiple membrane reactors to respective bores of the tubular membranes;

flowing a sweep gas through the respective bores to displace hydrogen in a direction countercurrent to flow of hydrocarbon and steam external to the tubular membranes;

discharging hydrogen as permeate with the sweep gas from the respective bores;

discharging carbon dioxide external to the tubular membranes as retentate from the multiple membrane reactors;

flowing retentate from a first membrane reactor of the multiple membrane reactors to a second membrane reactor of the multiple membrane reactors; and electrically heating a third membrane reactor and a fourth membrane reactor of the multiple membrane reactors via a heat distribution plate that contacts an outer surface of the respective outer conduit of the third membrane reactor and contacts an outer surface of the respective outer conduit of the fourth membrane reactor.

18. The method of claim 17, wherein retentate comprises unreacted steam, and wherein the catalyst comprises water-gas shift (WGS) catalyst.

19. The method of claim 17, wherein the catalyst is coated on an inside surface of the respective outer conduit of each membrane reactor of the multiple membrane reactors, and wherein the retentate from the first membrane reactor comprises steam and hydrocarbon unreacted in the first membrane reactor.

20. The method of claim 17, wherein displacing hydrogen in the respective bores with the sweep gas increases permeation of hydrogen external to the tubular membranes through the tubular membranes.

21. The method of claim 17, comprising electrically heating the multiple membrane reactors, wherein an operating temperature of the multiple membrane reactors is less than 650° C.

22. The method of claim 21, wherein electrically heating the multiple membrane reactors comprises electrically heating the third membrane reactor and the fourth membrane reactor via the heat distribution plate.

23. The method of claim 17, wherein an operating pressure external to the tubular membranes in the multiple membrane reactors is in a range of 10 bar to 50 bar, and wherein an operating pressure of the respective bores is in a range of 1 bar to 5 bar.

24. The method of claim 17, wherein producing hydrogen comprises producing hydrogen at less than 5,000 normal cubic meter per hour ($Nm^3/hr$).

25. The method of claim 17, wherein diffusing the hydrogen through the tubular membranes is contemporaneous with converting the hydrocarbon to hydrogen.

26. The method of claim 17, wherein the catalyst is washcoated on an inside surface of the respective outer conduit of each membrane reactor of the multiple membrane reactors.

27. The method of claim 17, comprising discharging hydrogen as permeate with the sweep gas from at least one bore of the respective bores as product hydrogen from the membrane reformer, wherein the product hydrogen comprises at least 90 mole percent hydrogen on a basis free of sweep gas.

28. The method of claim 27, wherein the sweep gas comprises steam, and wherein the method comprises condensing the sweep gas in the product hydrogen to remove the sweep gas as liquid water from the product hydrogen.

29. A method of hydrogen generation, comprising:
producing hydrogen with a membrane reformer comprising multiple membrane reactors, wherein each membrane reactor comprises an outer tube, a catalyst in the outer tube, and a tubular membrane in the outer tube, the producing comprising for each membrane reactor:

converting hydrocarbon into hydrogen and carbon dioxide in a region in the outer tube external to the tubular membrane in presence of steam via the catalyst disposed in the region, wherein the catalyst comprises reforming catalyst, and wherein the catalyst is not in contact with the tubular membrane;

diffusing hydrogen from the region through the tubular membrane into a bore of the tubular membrane, wherein the region is a retentate side of the tubular membrane, and wherein the bore is a permeate side of the tubular membrane;

discharging carbon dioxide from the region;

flowing a sweep gas through the bore to displace hydrogen from the bore in a direction countercurrent to flow of the hydrocarbon in the region external to the tubular membrane; and discharging hydrogen and sweep gas from the bore;

flowing carbon dioxide discharged from the region of a first membrane reactor of the multiple membrane reactors to the region of a second membrane reactor of the multiple membrane reactors; and electrically heating a third membrane reactor and a fourth membrane reactor of the multiple membrane reactors via a heat distribution plate that contacts an outer surface of the outer tube of the third membrane reactor and that contacts an outer surface of the outer tube of the fourth membrane reactor.

30. The method of claim 29, wherein the tubular membrane comprises two tubular membranes coupled longitudinally.

31. The method of claim 29, comprising facilitating flow of the sweep gas in the countercurrent direction via an insertion tube disposed in the bore.

32. The method of claim 29, wherein discharging the carbon dioxide comprises discharging the carbon dioxide with unreacted steam from the region, and wherein the catalyst comprises water-gas shift (WGS) catalyst.

33. The method of claim 29, wherein an operating temperature of the membrane reactor is less than 650° C., wherein an operating pressure external to the tubular membrane in the outer tube is in a range of 10 bar to 50 bar, wherein an operating pressure of the bore is in a range of 1 bar to 5 bar, and wherein the carbon dioxide from the region of the first membrane reactor comprises unreacted steam and unreacted hydrocarbon.

34. The method of claim 29, wherein an outer diameter of the outer tube is in a range of 15 millimeters (mm) to 50 mm, wherein a wall thickness of the outer tube is in a range of 1 mm to 3 mm, wherein an outer diameter of the tubular membrane is in a range of 8 mm to 30 mm, and wherein a wall thickness of the tubular membrane is in a range of 1 mm to 3.5 mm.

35. The method of claim 29, wherein the catalyst is coated on an inside surface of the outer tube of each membrane reactor of the multiple membrane reactors.

36. The method of claim 29, comprising discharging hydrogen from the membrane reformer as product hydrogen, wherein the product hydrogen comprises at least 90 mole percent hydrogen on a basis free of sweep gas, wherein the outer tube of a given membrane reactor of the multiple membrane reactors is not the outer tube of other membrane reactors of the multiple membrane reactors.

37. The method of claim 36, wherein the sweep gas comprises steam, and wherein the product hydrogen comprises at least 90 mole percent on a dry basis.

38. The method of claim 29, wherein producing hydrogen comprises with at least one of the multiple membrane reactors converting hydrocarbon to hydrogen with a dry reforming catalyst in an outlet portion of the outer tube.

39. The method of claim 38, wherein the dry reforming catalyst comprises nickel-molybdenum (Ni—Mo) on magnesium oxide (MgO), or a noble metal-based catalyst.

\* \* \* \* \*